US005539895A

United States Patent [19]

Bishop et al.

[11] Patent Number: 5,539,895

[45] Date of Patent: Jul. 23, 1996

[54] HIERARCHICAL COMPUTER CACHE SYSTEM

[75] Inventors: James W. Bishop, Endicott, N.Y.; Charles E. Carmack, Jr.; Patrick W. Gallagher, both of Rochester, Minn.; Stefan P. Jackowski, Endicott, N.Y.; Gregory R. Klouda, Endwell, N.Y.; Robert D. Siegl, Endicott, N.Y.

[73] Assignee: International Business Machines Corporation, Armonk, N.Y.

[21] Appl. No.: 241,910

[22] Filed: May 12, 1994

[51] Int. Cl.[6] .......................... G06F 12/00; G06F 12/08; G06F 12/12; G06F 13/00

[52] U.S. Cl. ...................... 395/465; 395/444; 395/445; 395/446; 395/447; 395/449; 395/468; 395/492

[58] Field of Search ........................ 395/465, 449, 395/451, 466, 445, 446, 473, 468, 444, 447, 492

[56] References Cited

U.S. PATENT DOCUMENTS

| | | | |
|---|---|---|---|
| 3,735,360 | 5/1973 | Anderson et al. | 395/250 |
| 4,044,337 | 8/1977 | Hicks et al. | 395/250 |
| 4,084,231 | 4/1978 | Capozzi et al. | 395/444 |
| 4,096,567 | 6/1978 | Millard et al. | 395/600 |
| 4,298,929 | 11/1981 | Capozzi | 395/411 |
| 4,394,731 | 7/1983 | Flusche et al. | 395/472 |
| 4,394,733 | 7/1983 | Swenson | 395/403 |
| 4,442,487 | 4/1984 | Fletcher et al. | 395/449 |
| 4,445,174 | 4/1984 | Fletcher | 395/448 |
| 4,467,411 | 8/1984 | Fry et al. | 395/250 |
| 4,484,267 | 11/1984 | Fletcher | 395/451 |
| 4,525,780 | 6/1985 | Bratt et al. | 395/490 |
| 4,535,455 | 8/1985 | Peterson | 395/182.04 |
| 4,564,899 | 1/1986 | Holly et al. | 395/284 |
| 4,633,440 | 12/1986 | Palulski | 365/189.05 |
| 4,703,481 | 10/1987 | Fremont | 395/182.15 |
| 4,774,654 | 9/1988 | Pomerene et al. | 395/449 |
| 4,797,814 | 1/1989 | Brenza | 395/403 |
| 4,891,809 | 1/1990 | Hazawa | 371/3 |
| 4,907,228 | 3/1990 | Bruckert et al. | 395/182.09 |
| 4,912,707 | 3/1990 | Kogge et al. | 395/182.15 |
| 4,924,466 | 5/1990 | Gregor et al. | 395/182.14 |
| 4,947,319 | 8/1990 | Bozman | 363/134 |

(List continued on next page.)

OTHER PUBLICATIONS

Shared Memory Systems on the Futurebus, Paul Sweazey, COMPCON Spring 88 IEEE Computer Society Intl Conference.

Dec 7000/10000 Model 600 AXP Multiprocessor Server, Brian Allison, COMPCON Spring '93, IEEE Computer Society Intl Conference.

IBM Technical Disclosure Bulletin, vol. 34, No. 3, Aug. 1991, pp. 256–258.

Primary Examiner—Tod R. Swann
Assistant Examiner—Christopher S. Chow
Attorney, Agent, or Firm—Arthur J. Samodovitz

[57] ABSTRACT

A hierarchical cache system comprises a plurality of first level cache subsystems for storing data or instructions of respective CPUs, a higher level cache subsystem containing data or instructions of the plurality of cache subsystems, and a main memory coupled to the higher level cache subsystem. A page mover is coupled to the higher level cache subsystem and main memory, and responds to a request from one of the CPUs to store data into the main memory, by storing the data into the main memory without copying previous contents of a store-to address of the request to the higher level cache subsystem in response to said request. Also, the page mover invalidates the previous contents in the higher level cache subsystem if already resident there when the CPU made the request. A buffering system within the page mover comprises request buffers and data segment buffers to store a segment of predetermined size of the data. When all of the request buffers have like priority and there are fewer request buffers that contain respective, outstanding requests than the number of data segment buffers, the page mover means allocates to the request buffers with outstanding requests use of the data segment buffers for which there are no outstanding requests.

18 Claims, 21 Drawing Sheets

U.S. PATENT DOCUMENTS

| | | | |
|---|---|---|---|
| 5,025,366 | 6/1991 | Baror | 395/455 |
| 5,097,532 | 3/1992 | Borup et al. | 395/425 |
| 5,113,514 | 5/1992 | Albonesi et al. | 395/471 |
| 5,153,881 | 10/1992 | Bruckert et al. | 395/182.08 |
| 5,155,832 | 10/1992 | Hunt | 395/447 |
| 5,265,212 | 11/1993 | Bruce | 395/325 |
| 5,325,503 | 6/1994 | Stevens et al. | 395/425 |
| 5,341,487 | 8/1994 | Derwin et al. | 395/425 |
| 5,353,423 | 10/1994 | Hamid et al. | 395/425 |
| 5,355,467 | 10/1994 | MacWilliams et al. | 395/425 |
| 5,388,246 | 2/1995 | Kasai | 395/425 |
| 5,426,765 | 6/1995 | Stevens et al. | 395/425 |
| 5,446,863 | 8/1995 | Stevens et al. | 395/427 |

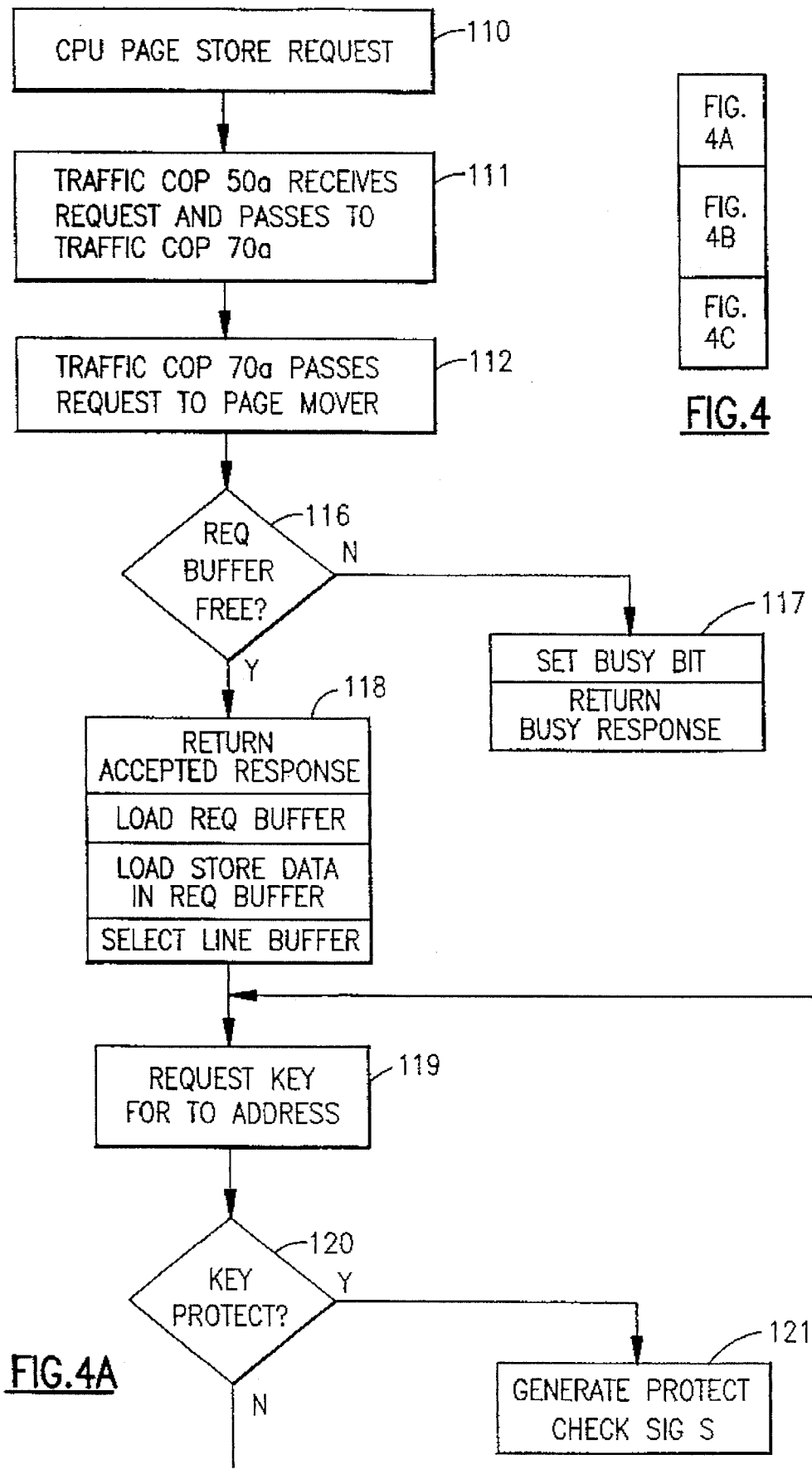

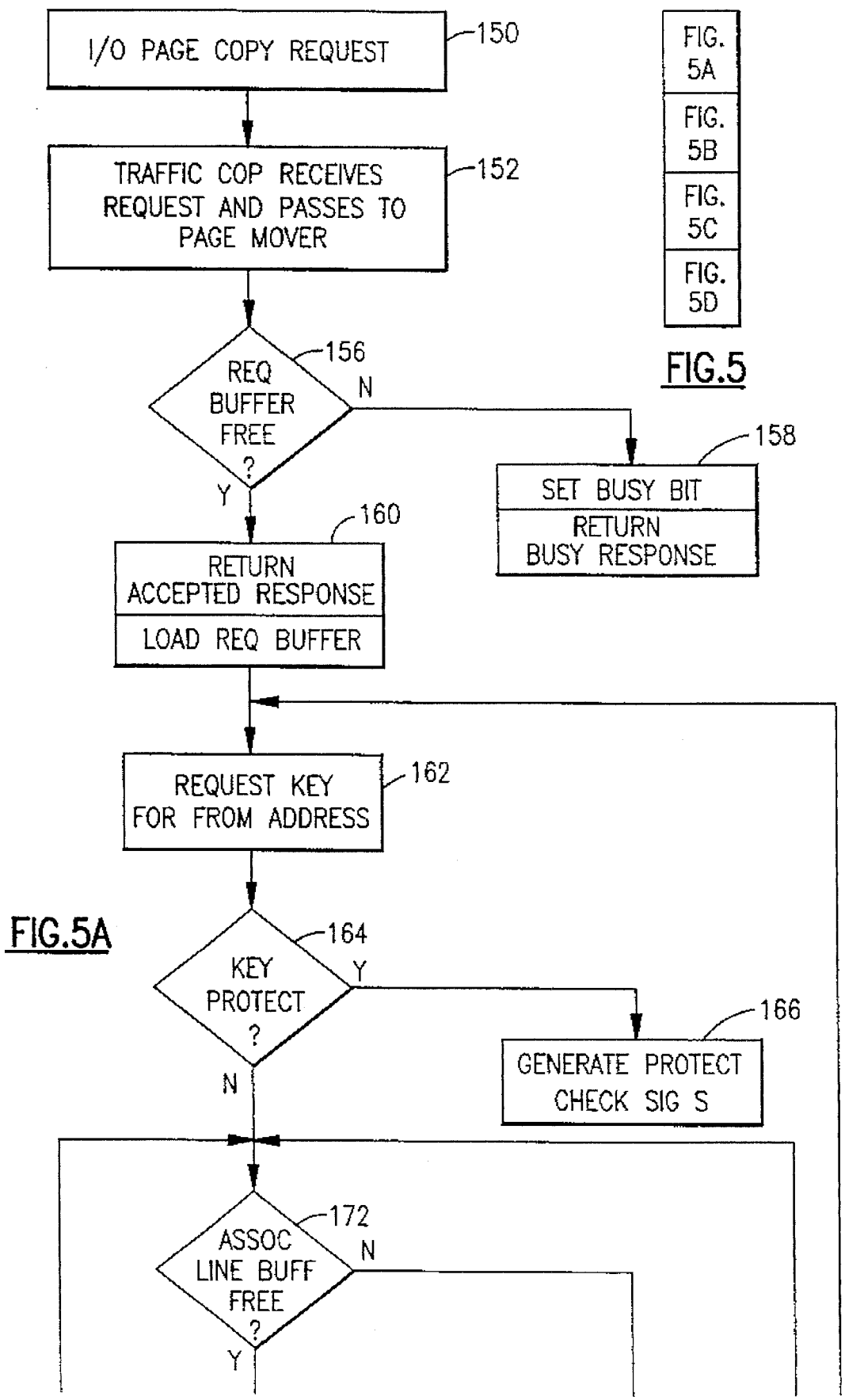

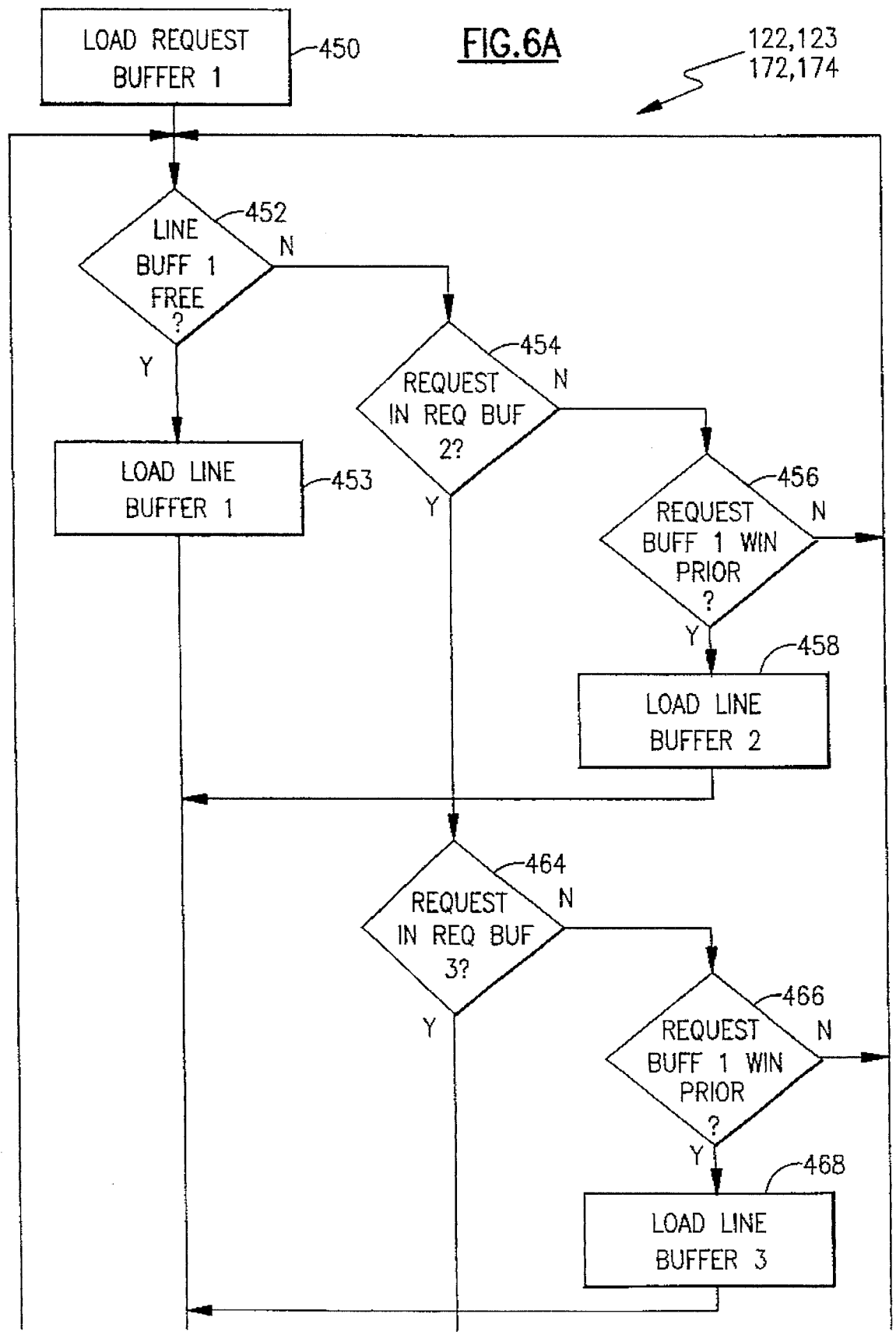

HIERARCHICAL COMPUTER CACHE SYSTEM

BACKGROUND OF THE INVENTION

The invention relates generally to computer systems, and deals more particularly with a hierarchical cache system.

Previously known computer systems include a CPU, a main memory and a cache system interposed between the CPU and the main memory to expedite access to main memory data. A typical cache system comprises a data cache to store data fetched from or written to main memory, and a directory to store main memory addresses of the data copied into the data cache. The processor can access the data cache faster than the main memory because the data cache is smaller than the main memory, physically located closer to the processor than the main memory, and usually formed from faster but more expensive technology. Consequently, it is desirable to store in the cache the data that is currently needed by the CPU and likely to be needed next. An effective caching strategy relies on spatial and temporal locality of reference, i.e. the data likely to be needed next by the processor is stored in the main memory near the data currently requested. This is true, for example, when the processor requests to sequentially read lines of a file, and the lines of the file are stored in successive locations in main memory. Therefore, when the processor requests data, typically four or eight bytes per request, this data along with the remainder of a cache block (typically one line comprising 128 bytes of contiguous addresses) are fetched from main memory and loaded into the data cache. The time cost of fetching the entire block from the relatively remote main memory is recovered when the processor accesses the remainder of a block (or line) from the cache.

It was also previously known to connect a set of I/O processors to the cache system such that data accessible from an external storage device via the I/O processors can be accessed by the CPUs from the cache system.

A hierarchical two level cache system was also known and includes a plurality of level one (L1) data caches and respective directories. Each pair of L1 cache and directory serves one processor. A level two (L2) data cache and associated directory are coupled to and serve all the L1 caches and associated directories. The L2 data cache is also coupled to the main memory (or extended memory), and stores a copy of all data requested by any of the processors. If another CPU requests the same data, then it is available from the L2 cache and need not be fetched from main memory (which is more time consuming). When any processor modifies data, the modified data is written to the L2 cache, and control hardware associated with the L2 data cache notifies all other L1 caches that contain a copy of the data that their copy of the data is now invalid. Thus, the L2 cache serves as a central station for transferring data between the main memory and all the L1 caches.

It was previously known to operate such a hierarchical cache system in either a "store through" mode or a "store in" mode. In the "store through" mode, the CPU requests to store data into the L2 cache only. If these memory locations are currently represented in the L2 cache, the data is stored in the L2 cache in these memory locations without accessing the main memory. If these memory locations are also represented in an L1 cache, these memory locations are invalidated in the L1 caches but the data is not written into them. If these memory locations are not currently represented in the L2 cache, then the contents of these memory locations and associated memory page are copied from main memory into the L2 cache and then overwritten with the CPU data. In this last case where these memory locations were not represented in the L2 cache, they were not present in any L1 cache either and therefore, no action is taken in any L1 cache.

In the "store in" mode, the CPU requests to store data in both the associated L1 cache and the L2 cache. If these memory locations are currently represented in the L2 cache, the data is stored in the L2 cache in these memory locations without accessing the main memory. Also, these memory locations represented in the associated L1 cache are updated with the new data. If these memory locations are represented in any other L1 caches, these memory locations in the other L1 caches are invalidated. If these memory locations are not currently represented in the L2 cache, then the contents of these memory locations and associated memory page are copied from main memory into the L2 cache and then overwritten with the CPU data. Then, the updated contents of these memory locations are written into the L1 cache of the requesting CPU.

In the foregoing hierarchical cache system of the prior art, if a CPU wanted to update data in the L3 cache or main memory, it was first necessary to copy the old data into the L2 cache as in the "store through" or "store in" mode and then update the data in the L2 cache and when requested, request a "cast out" of the updated data back to main memory. This had the following drawback in cases where the CPU did not want to immediately read the data or further update the data. It was time consuming and burdensome for the CPU to fetch the old data from main memory into the L2 cache, write the updated data into the L2 cache, and then cast out the updated data. Even if the data resided in the L2 cache before the main memory update request was made, it is time consuming to actually write the updates into the L2 cache and then cast out the updated data to main memory. Also, when the data is written into the L2 cache, some other data may be cast out to make room for the new data, and the CPU may need the data that was just cast out.

A general object of the present invention is to provide a hierarchical cache system in which a CPU can write data into main memory without also writing the data into the L2 cache or requiring that the old data reside in the L2 cache.

Another general object of the present invention is to provide a hierarchical cache system in which a CPU can copy data from one location in main memory or extended memory to another location in main memory or extended memory without also writing the data into the L2 cache.

Another general object of the present invention is to provide a hierarchical cache system of the foregoing types which requires minimal control by the CPU.

Another object of the present invention is to provide an improved buffering system for implementing the foregoing data movement.

SUMMARY OF THE INVENTION

The invention resides in a hierarchical cache system comprising a plurality of first level cache subsystems for storing data or instructions of respective CPUs, a higher level cache subsystem containing data or instructions of the plurality of cache subsystems, and a main memory coupled to the higher level cache subsystem. A page mover is coupled to the higher level cache subsystem and main memory, and responds to a request from one of the CPUs to store data into the main memory, by storing the data into the main memory without copying previous contents of a store-to address of the request to the higher level cache subsystem in response to said request. Also, the page mover invalidates the previous contents in the higher level cache subsystem if already resident there when the CPU made the request.

The invention also resides in a buffering system within the data mover. The buffering system comprises at least four request buffers to store requests to store or copy respective blocks of data, and a number of data segment buffers equal to the number of request buffers. Each of the data segment buffers is sized to store a segment of predetermined size of the data. The page mover selects in cyclical sequence the request buffers that contain respective, outstanding requests. Each time one of the request buffers is selected, the page mover passes a request to one of the data segment buffers to store or copy a segment of predetermined size of the data associated with the request in the selected request buffer.

DETAILED DESCRIPTION OF THE PREFERRED EMBODIMENTS

Figure 1:
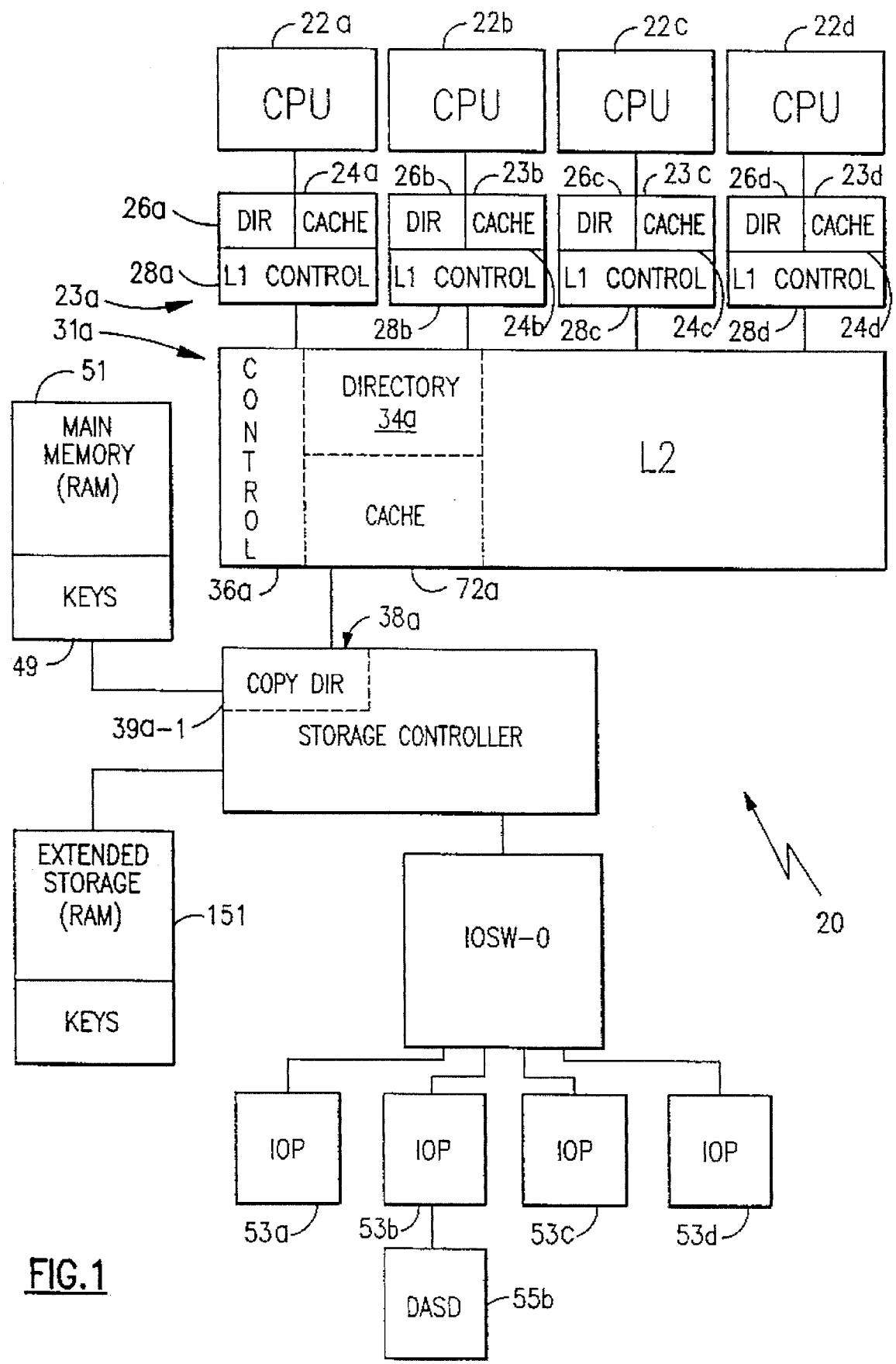
FIG. 1 is a block diagram of a hierarchical two level cache system according to the present invention.
Figure 2B:
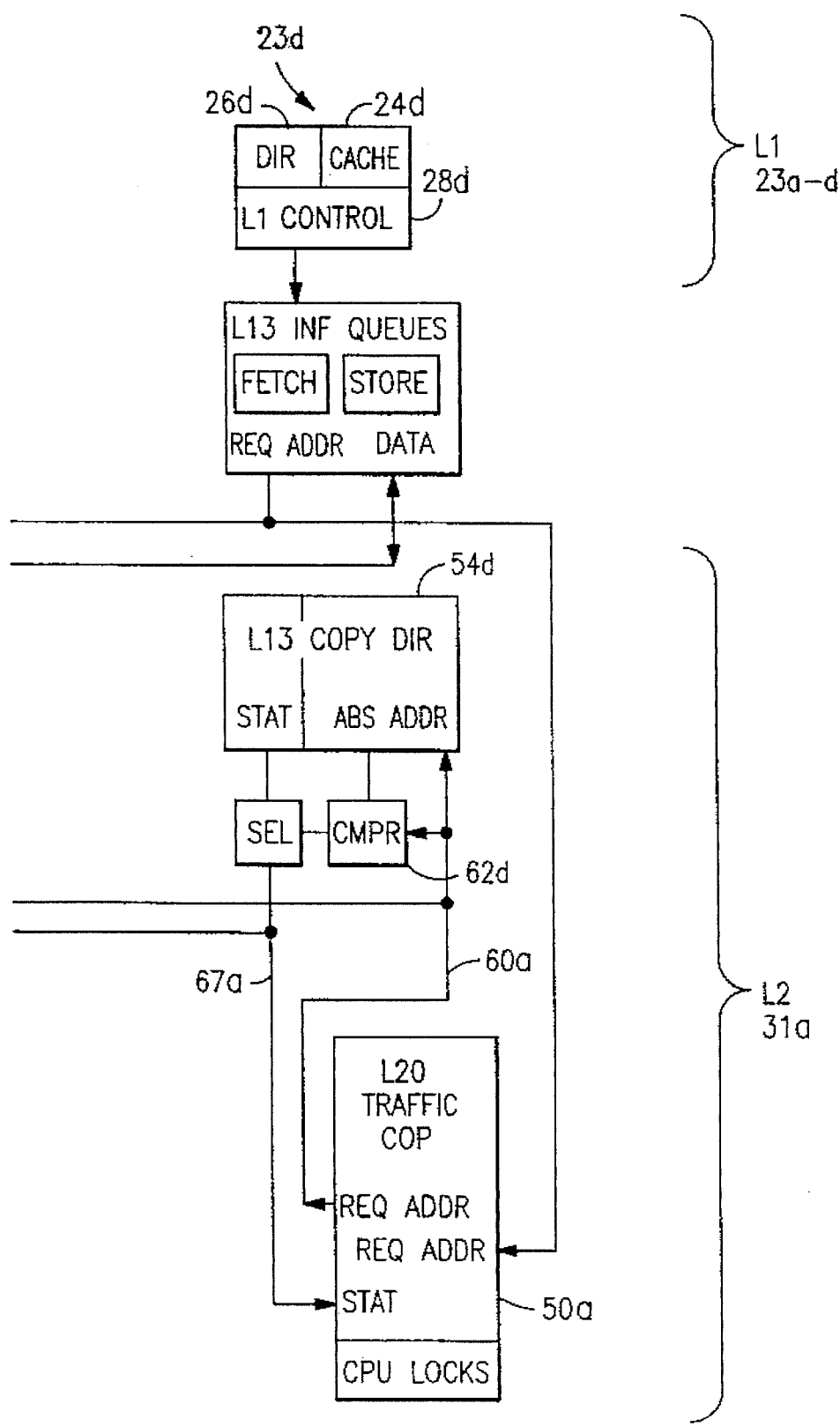
FIG. 2 is a more detailed block diagram of the two level cache system of FIG. 1.
Figure 2A:
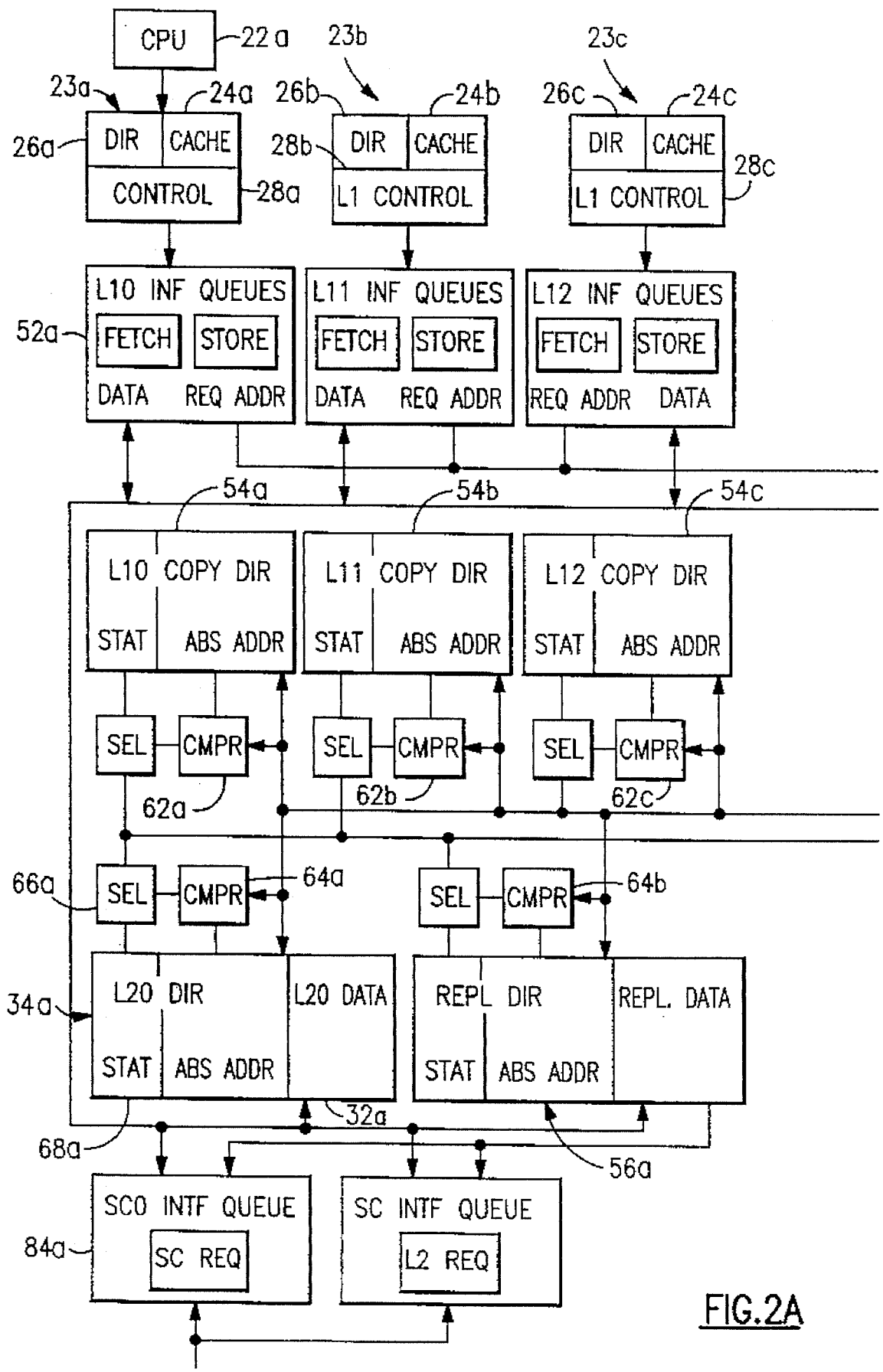
Figure 2C:
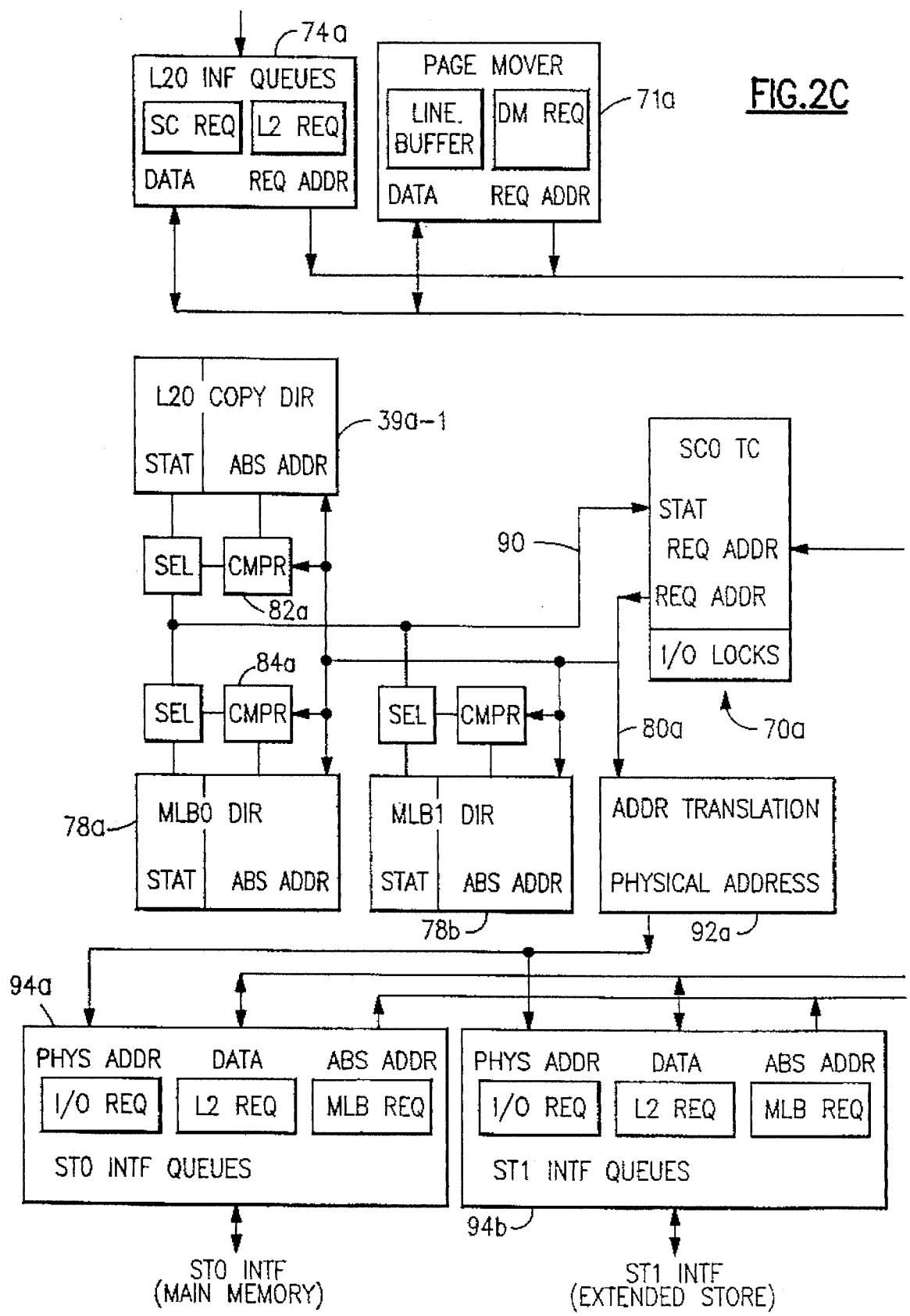
Figure 2D:
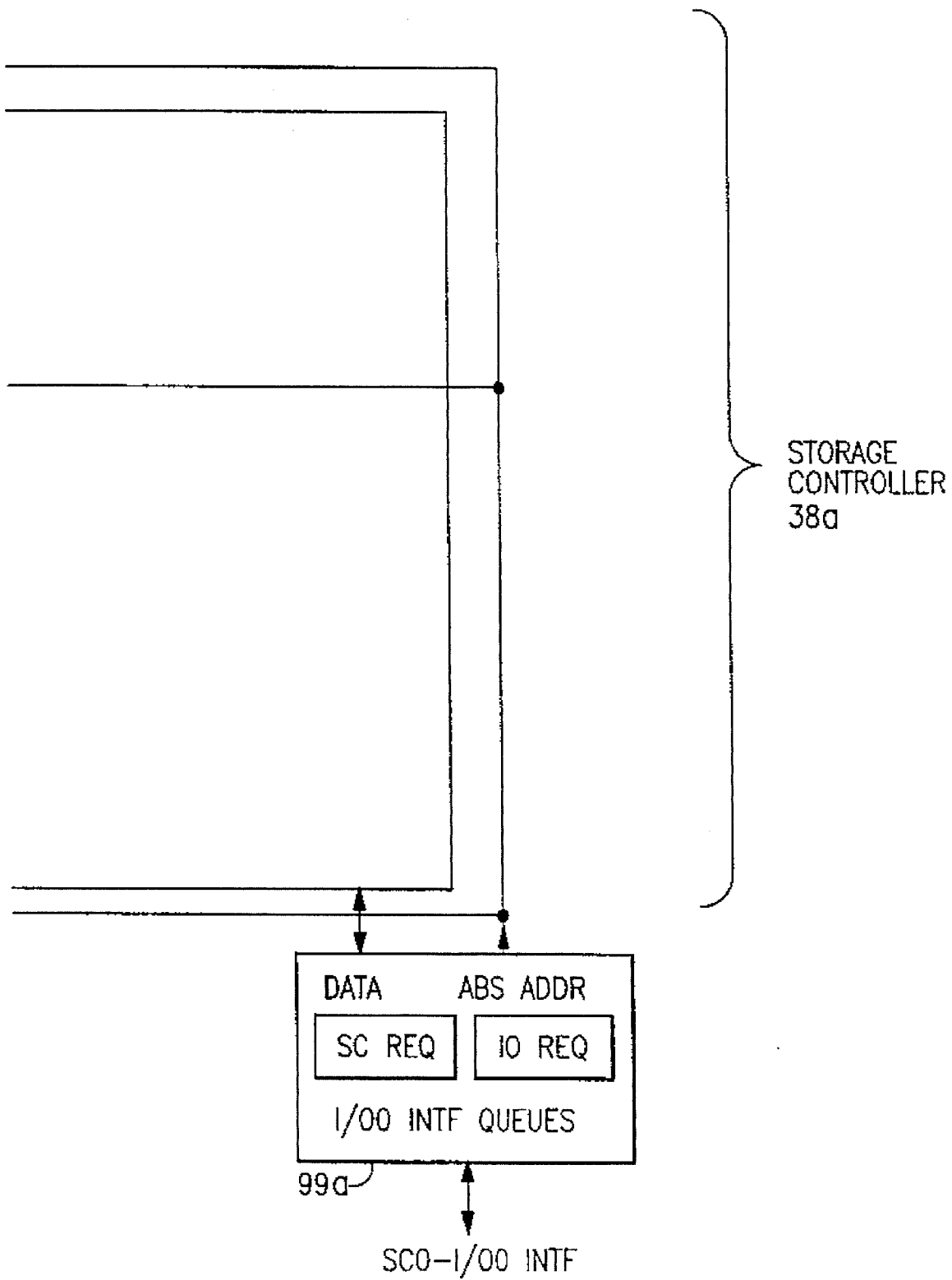

Referring now to the figures in detail wherein like reference numerals indicate like elements throughout the several views, FIG. 1 illustrates a hierarchical cache system generally designated 20 according to the present invention. Cache system 20 comprises four central processor units (CPUs) 22a–d and four respective level-one (L1) cache subsystems 23a–d. Each of the L1 cache subsystems comprises an L1 data or instruction cache 24a–d, a respective L1 directory 26a–d, and a respective L1 cache controller 28a–d. Each of the L1 cache subsystems serves one processor, and is known in the prior art. For example, U.S. Pat. No. 4,719,568 describes such an L1 cache subsystem of L1 cache, L1 directory and L1 cache controller.

Cache system 20 also comprises a level-two (L2) cache subsystem 31a. The L2 cache subsystem 31a comprise a data or instruction cache 32a, L2 directory 34a and an L2 cache controller 36a. L2 cache subsystem 31a serves all four L1 caches 24a–d. L2 directory 34a contains a copy of all data read from a main memory 51 into any of the L1 caches 24a,b,c,d or subsequently updated by CPUs 22a,b,c,d. L2 cache subsystem 31a also contains a copy directory 54a–d (FIG. 2) for each of the L1 caches 24a–d, to indicate address of data in the respective L1 caches and the status of the data in each address, i.e., valid, locked, fetch in progress, or invalidate exclusive. L2 cache subsystem 31a also contains a traffic cop 50a to mediate access to busses and use of resources within the L2 cache subsystem 31a. The L2 cache subsystem 31a also comprises a replacement directory 56a which indicates which data has been replaced and whether the replaced data was modified and requires a cast out operation to the main memory.

Cache system 20 also comprises a storage controller 38a for L2 cache subsystem 31a. Storage controller 38a serves as an interface between the L2 cache subsystem and main memory 51 (and between the L2 cache subsystem and a set of I/O processors 53a–d). Storage controller 38a contains a copy directory 39a–l for the addresses of all data stored in the L2 cache 32a and the status of the data in each address, i.e., valid, memory operation, L2 operation invalidate operation, channel store, channel fetch and I/O locks, respectively. The storage controller 38a also comprises a modified line buffer (MLB) directory 78a which stores addresses of modified lines on their way to be stored in main memory and the status of the data in each address, i.e., valid and castout pending. The storage controller also comprises a traffic cop 70a (FIG. 2) to mediate access to busses and use of resources within system 20.

The following is a flow description with reference to FIG. 2 of a CPU read request. The purpose of this description is to give some background on the operation of the L1 and L2 cache subsystems, before describing the main memory (and L4 or I/O) requests central to the present invention. The CPU read request (from CPU 22a is passed to the L1 cache controller 28a, and L1 cache controller 28a first checks the local L1 directory 26a for the address of the requested data. If the data is stored in the L1 data cache 24a, L1 cache controller 28a sends the data from the L1 cache 23a to the CPU 22a. However, if the data does not reside in the L1 cache 23a, then the CPU sends the address of the requested data to traffic cop circuit 50a in the L2 cache subsystem 31a via an L10 interface queue 54a. In response to the address of the requested data from the CPU 22a, the traffic cop 50a puts the address on an address bus 60a to be read by comparators 62a–d for L1 copy directories 54a–d, respectively and comparators 64a–b for L2 directory 34a and replacement directory 56a, respectively. Each of the comparators determines if the respective cache has a copy of the requested data by comparing the requested address to the addresses stored in the directory. If the data resides in the L2 cache 32a, then a selector 66a reads the associated status bits from status array 68a and furnishes them to traffic cop 50a via a status bus 67a. If the data is valid, then traffic cop 50a sends the data from the L2 cache 32a to the L1 cache 24a via a fetch buffer in L1 interface 54a.

However, if the data does not currently reside in L2 cache 32a, the traffic cop 50a sends the requested address to the storage controller traffic cop circuit 70a via a storage controller interface 84 and an L20 interface 74a. The storage controller traffic cop 70a puts the requested address on address bus 80a to be read by comparator 82a for L2 copy directory 39a–l and comparator 84a for MLB directory 78a. Assuming that the comparison made to the L2 copy directory 34a indicates that the L2 cache 32a does not have a copy of the requested data, then the data must be fetched from main memory. Assuming also that the modified line buffer directory 78a indicates that the modified line buffer does not have a copy of the requested data, then the storage controller traffic cop 70a sends the requested address to interface 94a or 94b to fetch the data from main memory.

The following is a description with reference to FIG. 2 of a CPU store request. The purpose of this description is also to give some background on the operation of the L1 and L2 cache subsystems, before describing the main memory requests central to the present invention. The request is sent directly to the L1 cache controller 28a and also to the traffic cop 50a via L1 interface 54a. L1 cache controller 28a first checks the local L1 directory 26a for the address of the requested data, and if the data is stored in the L1 cache, the data is updated in the L1 cache and a lock bit is set in L1 directory 26a. This data in the L1 cache 24a will be locked and therefore, inaccessible until the copy in the L2 cache is updated, and all the other copies in the other L1 caches are invalidated. While the request is being processed in the L1 cache subsystem 23a, the traffic cop 50a puts the address on the address bus 60a to determine if the data resides in the L2 cache 32a. If the data resides in the L1 cache 24a, then the data will also reside in L2 cache 32a. The contents of the L2 directory 34a indicate whether the data resides in the L2 cache 32a. Assuming the copy resides in the L2 cache 32a, then the copy is written into a buffer in L1 interface 54a, merged with the updates in this buffer and then the updated copy is written into the L2 cache 32a. Then, the traffic cop 50a sends an invalidate signal to each L1 cache controller 28b,c and/or d that has a copy of the data without the update. The identity of these L1 cache controllers 28 b,c and/or d is indicated by the comparison of the data address with the contents of the respective L1 copy directories 54 b,c and/or d. The traffic cop also signals the requesting L1 cache 28a that the store has completed successfully thus unlocking the address and allowing CPU 22a to use the data.

If the data did not reside in either the L1 cache 24a or the L2 cache 32a, then the address comparison in the L1 directory 26a and the L2 directory 34a will indicate misses and the traffic cop 50a will send a fetch exclusive (FE) request and address to storage controller traffic cop 70a via storage controller interface 84a and L20 interface 74a. The address comparison in storage controller 38a will indicate a miss for L2 copy directory 39a–l and either a hit or a miss for modified line buffer directory 78a. If there is a miss in the modified line buffer, then, traffic cop 70a sends the address (after translation by a physical address translator 92a) and the fetch exclusive request to main memory 51 (FIG. 1) via main memory interface 94a. The data is returned to the buffer in the L1 interface 54a via L2 interface 74a, SC interface 84a and L1 interface 54a. Once in the buffer, the data is merged with the updates from CPU 22a and then the traffic cop 50a reads the merged data from the buffer and writes it into L2 cache 32a, and sends a validate signal to L1 controller 28 to reset the lock in the L1 cache 24a.

FIG. 2 also illustrates I/O extended storage and interface queues 94b and 99a, respectively which handle extended storage and I/O operations. To simplify the figures, virtual to main memory address translation hardware and translation look aside buffers are not shown. They perform the following function. In many computer systems, programs executing on a processor identify data by address operands embedded within an instruction. The address operands are quickly converted by hardware to a "virtual" address, a location in the program's linear address space. Then hardware, with support from the operating system, dynamically translates the virtual address to the corresponding main memory address. The time required to perform the address translation is significant. Therefore, after the translation, the virtual address and the corresponding main memory address or relevant portions thereof, along with the program-specific control information, are stored in a translation lookaside buffer (TLB) for future reference.

The present invention is concerned mainly with a page mover 71a which resides in the storage controller 38a. The page mover 71a has three main functions. First, the page mover moves data, as requested, to the main memory or extended memory from the L2 cache, another location in main memory or extended memory 151. Second, the page mover writes data from the CPU to the main memory or extended memory. Third, the page mover can write a predetermined pattern or all zeros to a page of the main memory or extended memory. In all three cases, the work is offloaded from the CPU to the page mover, and the L2 cache is only effected if it contains a copy of the subject line. Thus, time is not wasted writing copies to the L2 cache (or L1 cache).

Figure 3:
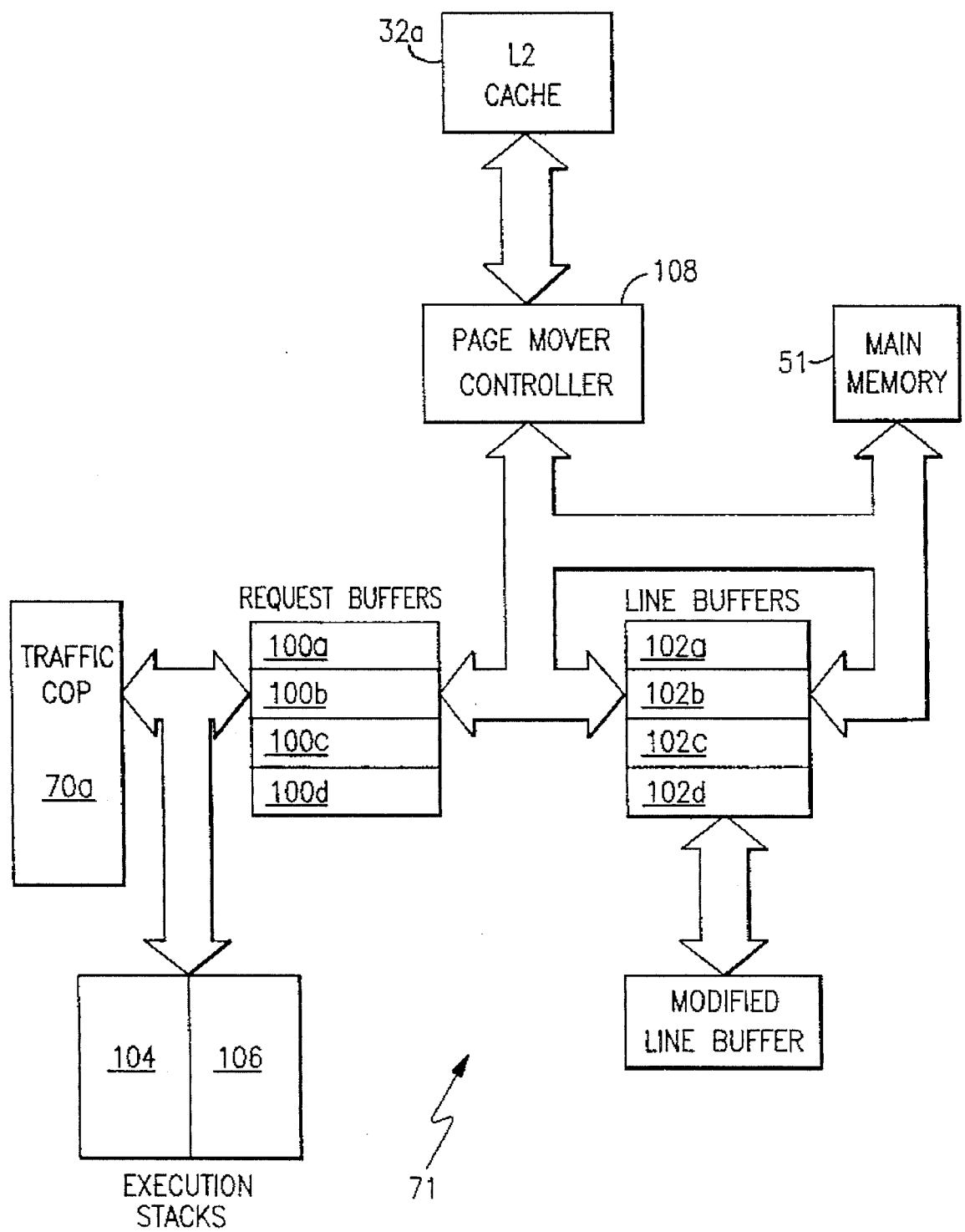
FIG. 3 is a block diagram of a page mover and other hardware within the cache system of FIG. 1.

As illustrated in FIG. 3, the page mover comprises four request buffers 100a–d each to store a command, source ID, destination ID, "From" address, "From" key, "To" address, "To" key, state bits, store data for a store request, and response byte. A pool of four one hundred twenty eight byte line buffers 102a–d are available for line requests parsed from the request buffer as described in more detail below. Each line buffer stores a From or To address, a line of data, state bits and request buffer ID associated with it. As described in more detail below, I/O line requests are passed from the line buffers to an I/O execution stack 104, and CPU line requests are passed from the line buffers to a CPU execution stack 106 in a subsequent stage before execution. Each execution stack contains for each line request, a pointer to the corresponding line buffer. A page mover controller 108 controls the parsing and passing of requests from request buffers to line buffers, and passing of line requests from line buffers to the stacks.

Each of the CPUs can issue three different types of commands to the data mover. CPU PAGE COPY command means that the page mover should read data from the 4K "From" address and store the data to the 4K "To" address in the target (main memory 51 or extended memory. If the data resides in the L2 cache it is read from there (but not invalidated in the L2 cache From address); otherwise it is read from main memory or extended memory. CPU PAGE COPY & PURGE command means that the page mover should read the data from the 4K "From" address and store the data in the 4K "To" address. If the data is found in and read from the L2 cache, it is invalidated in the L2 cache From address. For both CPU PAGE COPY and CPU PAGE COPY & PURGE operations, the storage to main memory or external storage device invalidates any copies found in the L2 cache (in the "To" address).

CPU PAGE STORE command means that the page mover should store actual data specified for each address in the entire 4K page, or a quadword pattern (which may be all zeros) supplied with the command to the entire 4K page. This command invalidates any copy found in the L2 cache storage address. In the case of a CPU PAGE STORE command, only a To address is provided in the command; there is no From address.

Each of the I/O processors 53a–d (FIG. 1) can also issue the following two commands. I/O PAGE COPY means that the page mover should read data from the 4K From address and store the data into the 4K To address. If the data resides in the L2 cache, it is read from the L2 cache but not invalidated in the L2 cache From address. Then, the data is stored to the destination and the L2 copy is invalidated at the L2 cache To address. I/O PAGE STORE ZERO command means that the page mover should store all zeros in the 4K To address, and invalidate any copy in the L2 cache at the L2 cache To address.

Figure 4B:
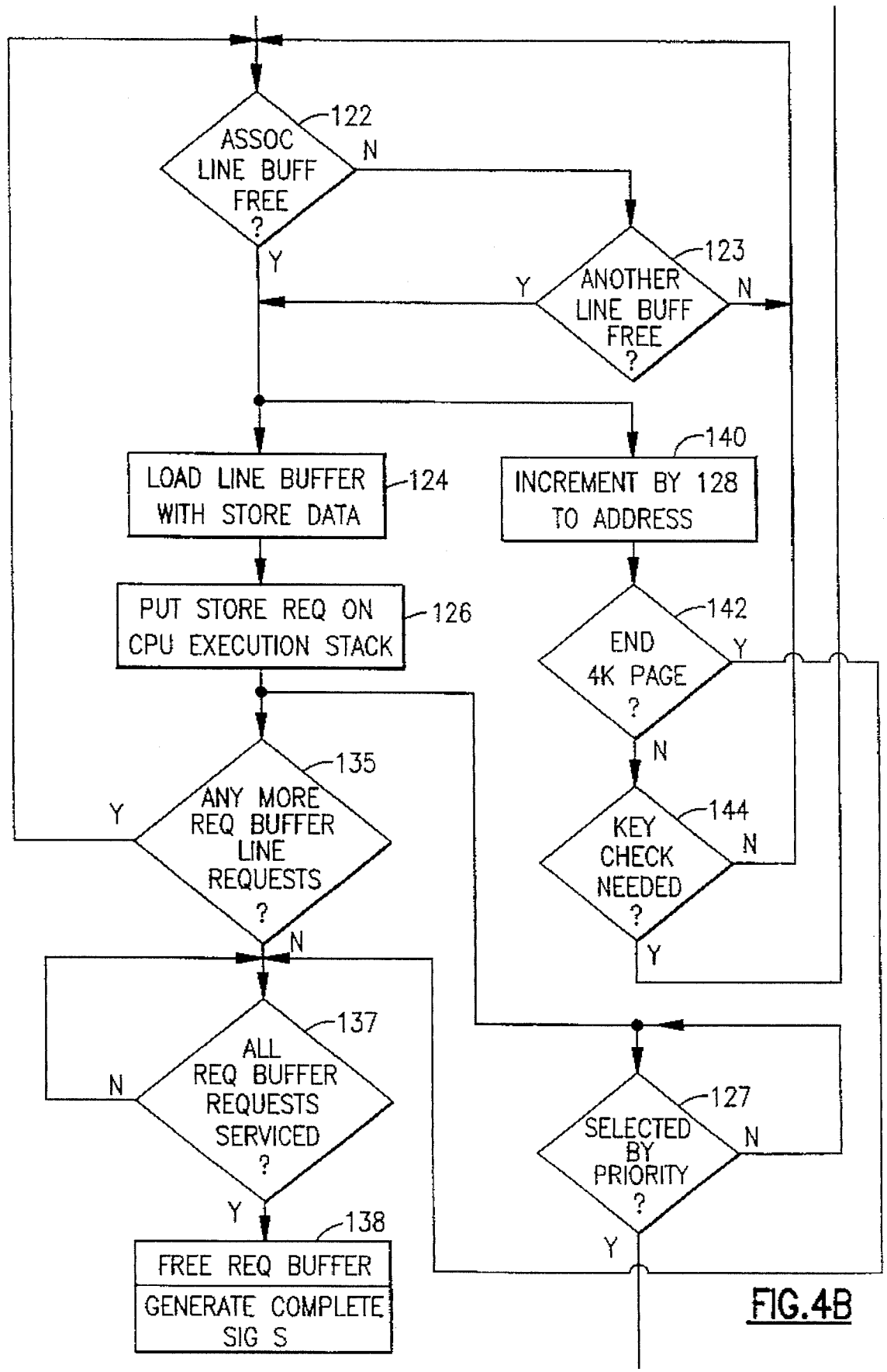
FIG. 4 is a flow chart of a CPU PAGE STORE operation within the cache system of FIG. 1 according to the present invention.
Figure 4C:
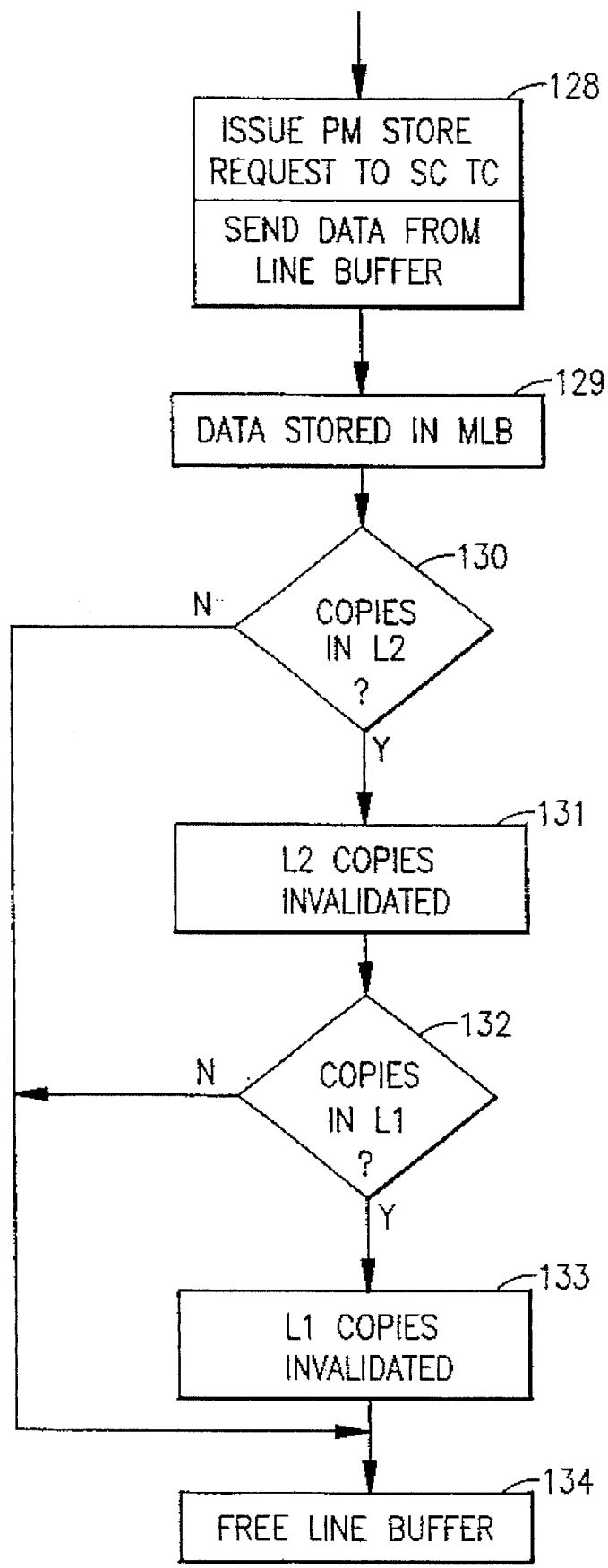

FIG. 4 illustrates flow of a CPU PAGE STORE request from CPU 22a to update data in main memory (step 110). The CPU 22a sends the request to the traffic cop 50a (FIG. 2) via L1 interface 54a (step 111). The request specifies a page of data to be written, the To address, i.e. the starting address for storage of the page of data, and that the data should be stored in main memory 51. (Alternately, the request could specify an address in extended memory, to store to.) Because the request is a main memory request, traffic cop 50a sends the request to traffic cop 70a of storage controller 38a via SC interface 85a and L20 interface 74a. The traffic cop 70a receives the CPU PAGE STORE request and then prioritizes it behind previously received requests of all types from the CPU. The traffic cop 70a also prioritizes ahead of all CPU requests all types of I/O processor requests whether previously received or subsequently received (before the remaining CPU requests are executed). Therefore, the traffic cop 70a sends any I/O processor requests to the page mover before any CPU requests, and in the absence of any I/O processor requests sends the CPU requests in FIFO order to the page mover (step 112).

The page mover cannot store or execute all requests immediately. Therefore, after receiving the CPU PAGE STORE request, page mover 71a determines if any of the four request buffers 100 and (FIG. 3) is available to receive the request (decision 116). If not, then the page mover returns a busy signal to the requesting CPU via the traffic cop 70a (FIG. 2) and sets a busy bit to signal the CPU when a request buffer becomes available (step 117). However, if one of the request buffers 100a–d is available, then the page mover returns an acceptance response to the requesting CPU via the traffic cop 70a (step 118). Also, the page mover loads the available request buffer with the request parameters defined above and page of data provided by the CPU (step 118). Thereafter, the page mover 71a views the page request and page of data as thirty two consecutive store requests for thirty two consecutive lines of the page. (As noted above, there are thirty two lines per page.)

At this point in the flow, there are one to four request buffers which contain requests, and each has its respective page logically divided into lines. The page mover selects the request buffers in a cyclical sequence, (for example, request buffers 100a, 100b, 100c, 100d, 100a, . . . ) and then determines if the requesting CPU for each selected request buffer is authorized to store to the address in the request buffer. Accordingly, the page mover requests the key for the To address from a key array 49 in main memory 51 and compares it to the key in the request (step 119 and decision 120). If the requesting CPU does not have the authority to update the To address or if there was an error in reading the key, the command is cancelled and an error signal with the appropriate response is sent to the CPU (step 121). If there was no such key error, a bit is set which indicates that no more key checking should be performed for the 4K page (unless the key is changed. If the state of any key is ever changed in the key interface, the address of the key is sent to the data mover. In response, the page mover compares the address against all addresses in the request buffer and for each request effected by the key change, resets the bits which currently indicate not to perform a key check. The next request involving the address effected by the key change will request a key check because of the bits which have been reset.)

If the CPU is authorized to write to the To address specified in the request, the page mover next attempts to find an available line buffer for the next line in each selected request buffer (decision 122). For each request buffer this involves a check whether the associated line buffer is available. If the associated line buffer is not available, the page mover determines if another one of the line buffers 102 (FIG. 3) is empty and if the selected request buffer is the highest priority request buffer that is waiting for a line buffer (decision 123). If so, or if the answer to decision 122 was yes, then the page mover proceeds to load the identified line buffer 102 with the next line from the request buffer that was selected in step 118 (step 124). Next, the page mover puts the parsed, line store request from the line buffer onto the CPU execution stack 106 (step 126). The page mover services the I/O execution stack before the CPU execution stack. When the I/O stack is empty and this line store request for the CPU is next on the CPU stack (decision 127), the page mover issues a page store request to the traffic cop 70a within the storage controller (step 128). Then, the traffic cop 70a sends the line of data from the line buffer to the modified line buffer/control (step 129). The modified line buffer/control sends the line of data to the destination, in the illustrated example to the main memory, when the bus frees up. While the data is sent to the modified line buffer, the traffic cop 70a also checks copy directory 39a–l (FIG. 2) to determine if the L2 cache 32a contains a copy of this page (decision 130). If so, the traffic cop 70a sends an invalidate signal to traffic cop 50a for the L2 cache 32a for this line and the invalidate signal is stored in the L2 directory 34a (step 131). While the traffic cop 50a invalidates the copy in the L2 cache, the traffic cop 50a (which is part of the L2 cache controller) also checks its L1 copy directories 54a–d to determine if any of the L1 caches contain a copy of this page, and if so, sends an invalidate signal to the L1 directory or directories in the L1 cache subsystems that contain a copy of this page (decision 132 and step 133). After sending the line to the modified line buffer and invalidating the L2 and L1 caches, the page mover frees the line buffer (step 134). In parallel with steps 127–134, the page mover determines if there are any more line requests in the line buffers (decision 135). If not, the page mover determines if there are any line requests in the line buffers which have been copied to the corresponding execution stack but not yet completed (decision 137). This includes the request that was just executed. If so, the page mover waits until all requests for line stores are complete and sends a completion signal to the CPU that originally made the respective requests (step 138).

Referring again to decision 135, if there are more line requests to be executed, the page mover returns to decision 122 to repeat the foregoing process for executing the additional line requests.

Referring again to the affirmative output of decision 122, while page mover executes steps 124, 126 etc., the page mover also increments the previous line address by one hundred twenty eight bytes to identify the starting address of the next line of the page (step 140). Then, the page mover determines if the result indicates an end of a page (decision 142). If so, then the page mover stops the incrementing. However, if the result does not indicate the end of a page, the page mover determines if a key check is required (step 144). A key check is required if the address indicates the start of a new page or if the key for the page was changed since the last check. If a key check is required, the page mover loops back to step 162 to check the key in the manner noted above.

Figure 5B:
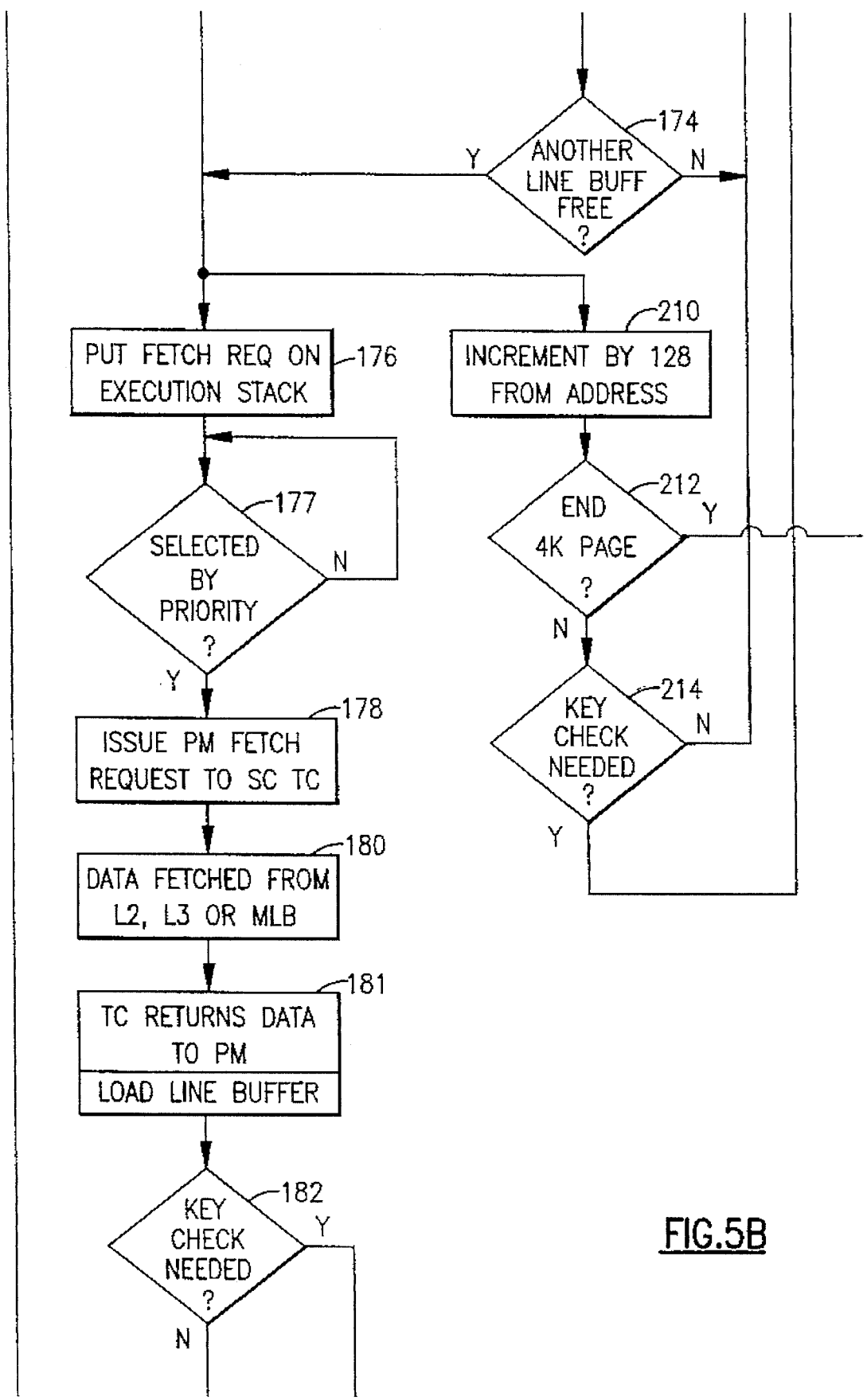
FIG. 5 is a flow chart of an I/O PAGE COPY operation within the cache system of FIG. 1 according to the present invention.
Figure 5C:
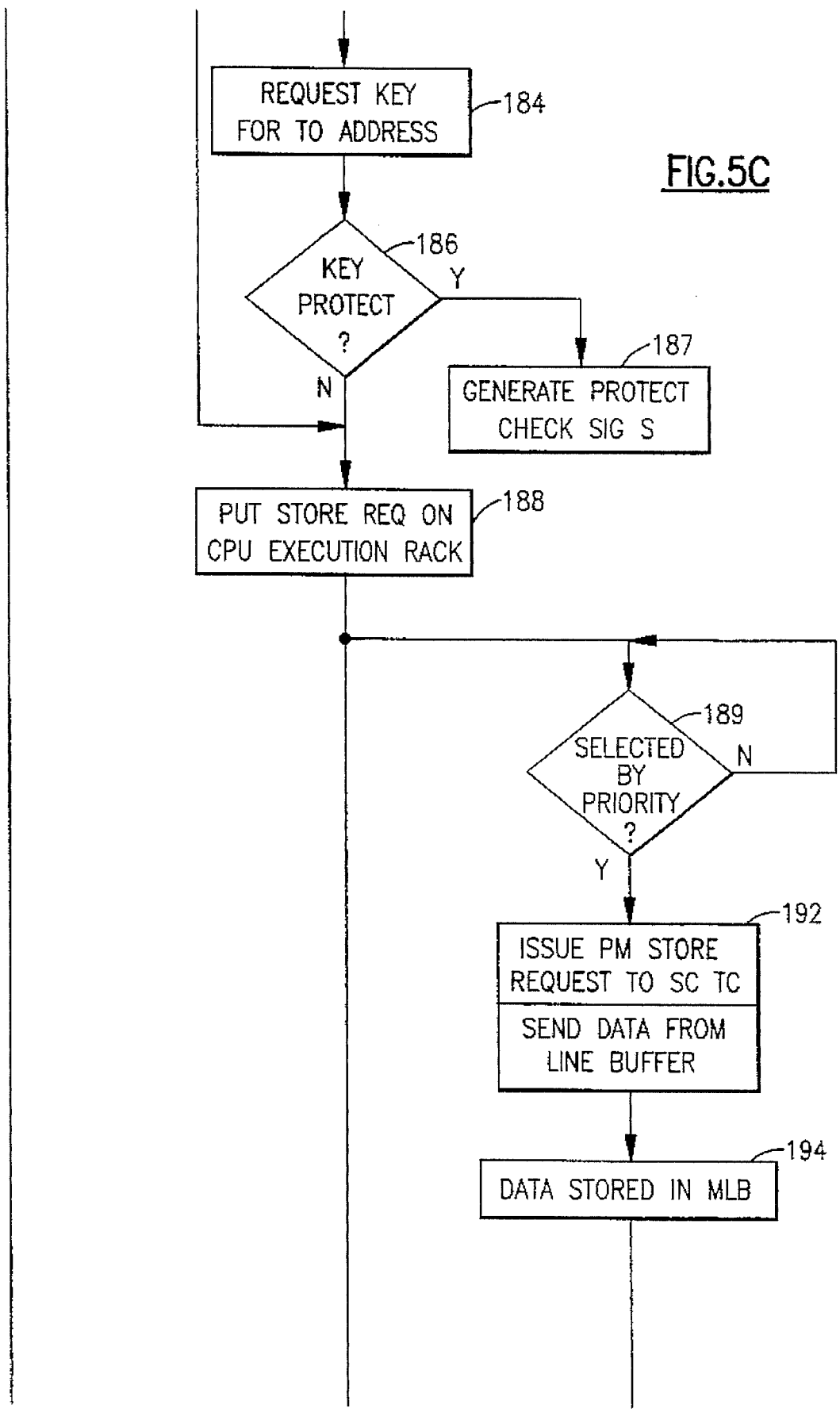
Figure 5D:
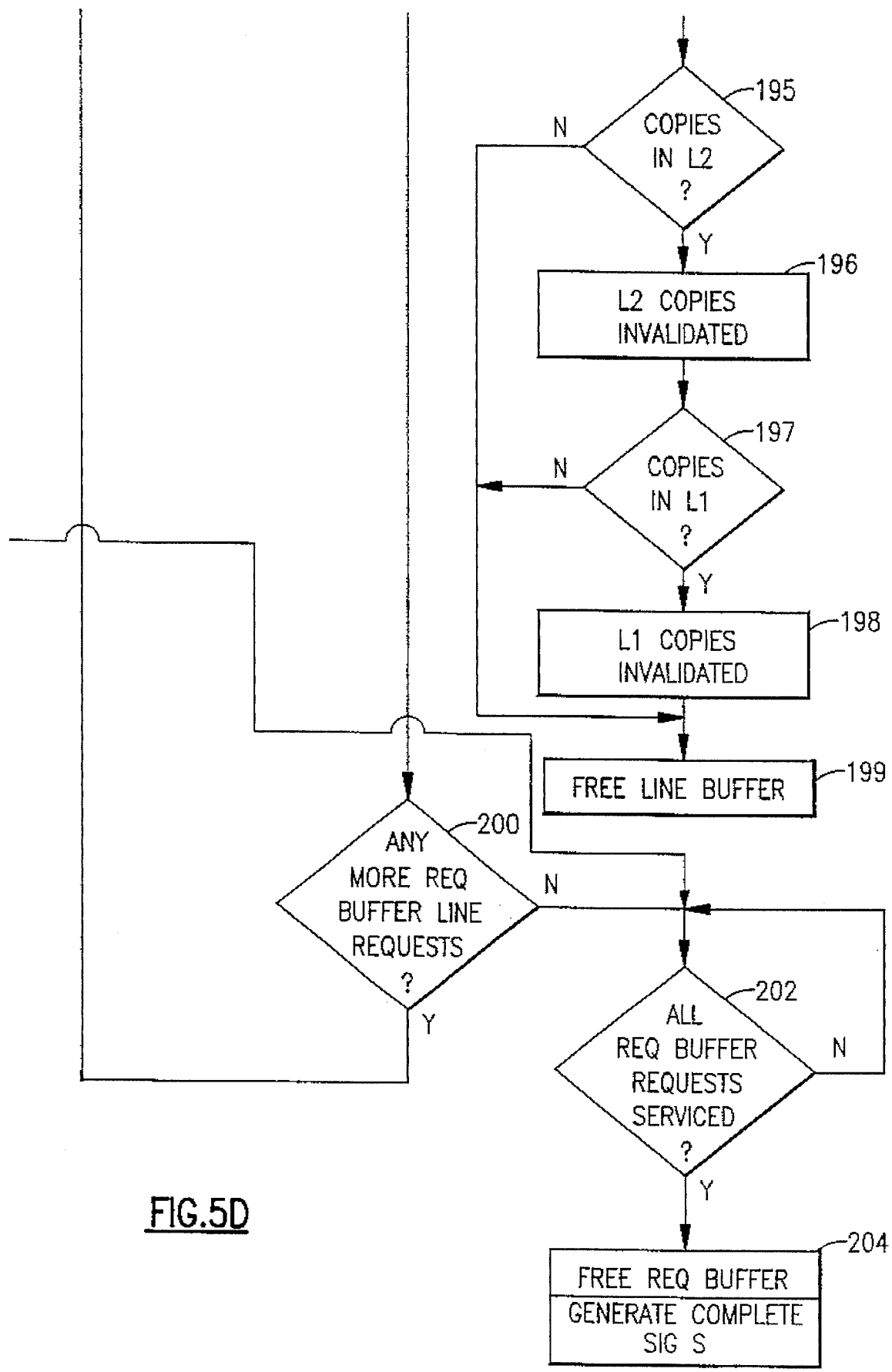

The following is a flow description for an I/O PAGE COPY request by I/O processor 53a (FIG. 1) as illustrated in FIG. 5. The I/O processor 53a sends the request to the traffic cop 70a via I/O processor interface 97a (or 99a) (step 150). The request specifies the starting From address of the page in main memory 51 (FIG. 1) to be copied from and the starting To address in main memory to copy to. (Alternately, the request could specify an address in extended memory or L3 cache, if there was one, to copy from or to.) Then, traffic cop 70a passes the request, after all previously received I/O processor requests, to page mover 71a for processing (step 152). In response, the page mover determines if one of the request buffers 100a–d is available (decision 156). If not, the page mover sets a busy bit, indicating a busy response was sent to the requesting I/O processor, and returns a busy response to the traffic cop 70a and the traffic cop 70a forwards the busy response to the requesting I/O processor (step 158). If one of the request buffers is available, the page mover loads the request into it and returns an acceptance signal to the requesting I/O processor via the traffic cop 70a (step 160). Next, the page mover requests the key for the From address from the main memory key array 49 (step 162), and compares this key to the key of the requesting I/O processor. If the I/O processor does not have the requisite authority, the page mover returns a key error signal to the traffic cop 70a and the traffic cop passes the key error signal to the I/O processor (decision 164 and step 166). However, if the I/O processor has authority to access the address specified in the request buffer, the page mover next determines if the associated line buffer 102a is free (decision 172). If not, the page mover determines if another one of the line buffers 102b–d is available to I/O processor 53a (decision 174). If so, or if the answer to decision 172 was yes, then the page mover puts a line fetch request portion of the I/O PAGE COPY REQUEST onto execution stack 104 (step 176). When this line request is next on execution stack 104 (decision 177), the page mover passes the line fetch request to the traffic cop 70a (step 178) and then the traffic cop 70a fetches the line of data from main memory 51 (step 180). (However, if the data also resides in the L2 cache or in the modified line buffer, then the traffic cop 70a fetches the data from the L2 cache or modified line buffer instead.) Next, the traffic cop 70a returns the data to the page mover and the page mover loads the data in the line buffer (step 181). Next, the page mover determines if a key check is required to write to the desired memory locations (decision 182). If the line in the line buffer is the first line of a page or if the key for the To address has been changed, then the I/O processor's key must be checked. This check is performed by fetching the key for this page from key array 49 (step 184), and then comparing the I/O processor's key provided with the request for this page to the key fetched from main memory (step 186). If the I/O processor is not authorized to write to the address specified in the request, the page mover returns a key error signal to the traffic cop 70a, and the traffic cop 70a returns the key error signal to the I/O processor (step 187). Otherwise, the page mover next puts a store request corresponding to the line buffer that just completed the fetch onto execution stack 104 (FIG. 3) (step 188). As noted above, the I/O operations have higher priority than the CPU operations (decision 189), and when this line store request reaches to the top of the stack 104, the page mover sends it to the traffic cop 70a and the traffic cop 70a sends the line of data from the line buffer to the modified line buffer (steps 192 and 194). While the data is received into the modified line buffer, the traffic cop 70a checks the copy directory in the storage controller to determine if the L2 cache contains a copy of this line (step 195). If so, the traffic cop 70a sends an invalidate signal to the traffic cop 50a of the L2 cache subsystem 31a for this line and the invalidate signals is stored in the L2 directory 34a (step 196). While the traffic cop 50a invalidates the copy in the L2 cache, the L2 controller also checks its L1 copy directories 54a–d to determine if any of the L1 caches contain a copy of this page (decision 197), and if so, sends an invalidate signal to the L1 directory or directories in the L1 cache subsystems that contain a copy of this line (step 198). After sending the line to the modified line buffer and the invalidating the L2 and L1 cache copies, the page mover frees the line buffer (step 199).

In parallel with steps 189–199, the page mover determines if there are any more requests in the request buffers (decision 200). If not, the page mover determines if there are any line requests in the line buffers which have been copied to the corresponding execution stack but not yet completed (decision 202). The page mover loops through decision 202 until all requests in the execution stack have been executed. Then the page mover frees the request buffers and sends a completion signal to the I/O processor that originally made the respective request (step 204).

Referring again to decision 200, if there are more requests in the line buffers that have been sent to the corresponding stack but not yet completed, the page mover returns to decision 172 to repeat the foregoing process for executing the additional line requests.

Referring again to the affirmative output of decision 172, while page mover executes 176, 178 etc., the page mover also increments the previous line address by one hundred twenty eight bytes to identify the starting address of the next line of the page (step 210). Then, the page mover determines if the result indicate an end of a page (decision 212). If so, then the page mover stops the incrementing. However, if the result does not indicate the end of a page, the page mover determines if a key check is required (step 214). A key check is required if the address indicates the start of a new page or if the key for the page was changed since the last check. If a key check is required, the page mover loops back to step 162 to check the key in the manner noted above.

The I/O PAGE STORE ZERO operation is the same as the CPU PAGE STORE operation and is executed as in FIG. 4, except the I/O PAGE STORE ZERO command originates from an I/O processor instead of a CPU, and no explicit data is provided; from the command the page mover knows to write all zeros in the line buffers in step 118.

The CPU PAGE COPY operation is the same as the I/O PAGE COPY operation and is executed as in FIG. 5 except the CPU PAGE COPY command originates from a CPU instead of an I/O processor and reaches the traffic cop 70a via the traffic cop 50a.

The CPU PAGE COPY & PURGE operation is the same as the I/O PAGE COPY operation and is executed as in FIG. 5 except the CPU PAGE COPY & PURGE command originates from a CPU instead of an I/O processor and during the fetch from L2 cache (steps 180–181, assuming the data resides in the L2 cache), the CPU PAGE COPY & PURGE operation always invalidates the From address in the L2 cache of the L2 copy that was just fetched whereas the CPU PAGE COPY operation does not invalidate the From address in the L2 cache of the L2 copy upon the fetch operation. During the subsequent store operation for the CPU PAGE COPY & PURGE, CPU PAGE COPY and I/O PAGE COPY operations, if the data for the To address also resides in the L2 cache it is invalidated there.

Figure 6B:
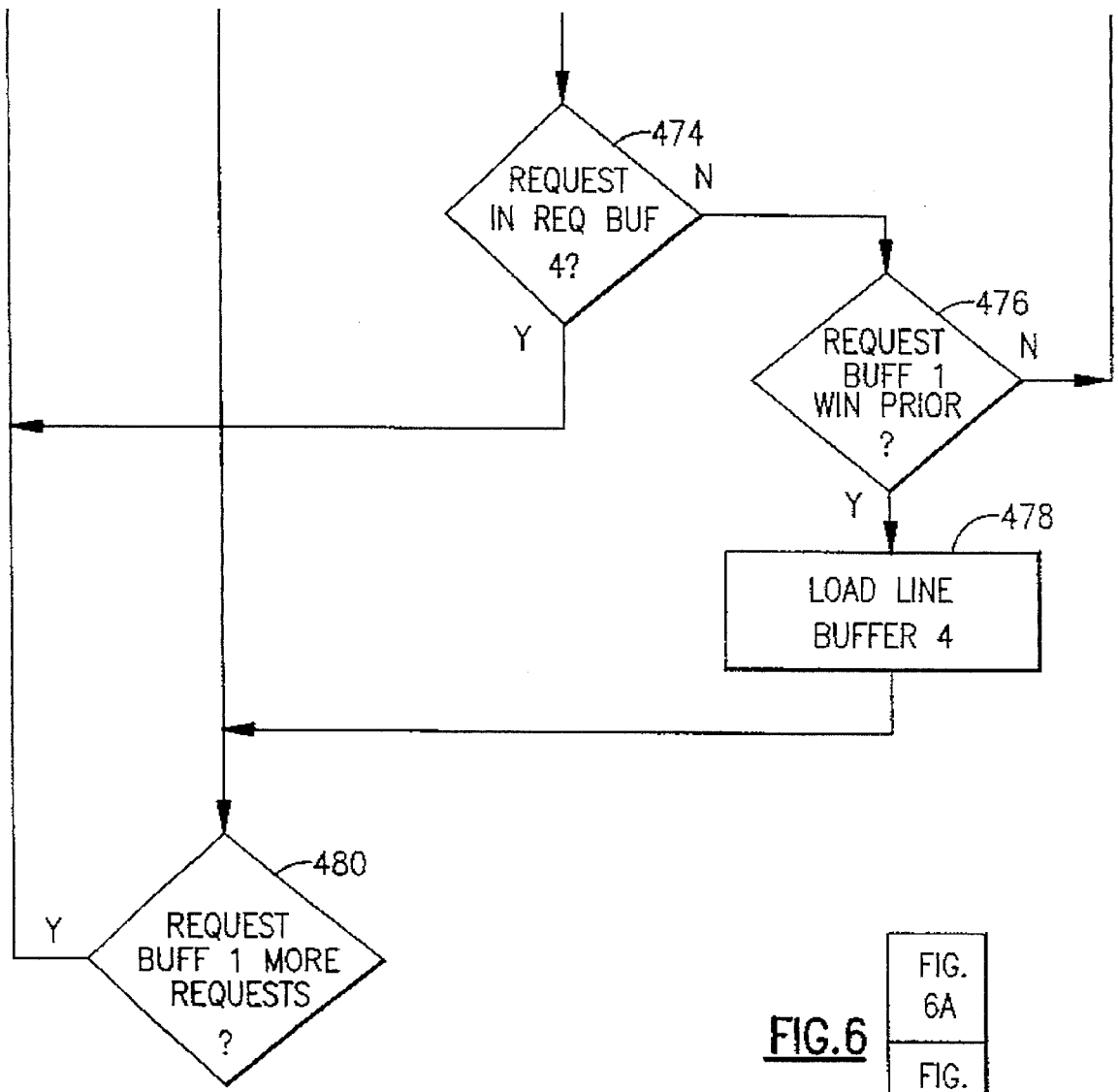
FIG. 6 is a detailed flow chart of a buffering process within the CPU PAGE STORE and I/O PAGE COPY operations of FIG. 4 and FIG. 5.

FIG. 6 illustrates in more detail the foregoing steps 119–120 and 172–174 for determining which line buffer to allocate to each request buffer. It should be noted that the page mover is implemented in hardware which corresponds to the flowchart. The request buffers are selected in round robin sequence. When selected, each request buffer can always use the associated line buffer after the associated line buffer frees up. However, if one or more line buffers are available, i.e. there is no request in the corresponding request buffer(s), they are available to the highest priority request buffer(s). The flowchart of FIG. 6 is specific to request buffer 100a (FIG. 3) but each of the other request buffers is operated in an analogous manner. In step 450, the page mover loads request buffer 100a. Then, the page mover determines if line buffer 102a is available (decision 452). If so, then the page mover loads line buffer 102a with the next line request from request buffer 100a (step 453) and then determines if there is another request requiring a request buffer (decision 480). However, if line buffer 102a is not available due to storage of a previous, but yet unexecuted line request from request buffer 100a (or due to storage of a previous, but yet unexecuted line request from another request buffer before a request was stored in request buffer 100a), then the page mover performs the following steps to determine if another one of the line buffers is free and if request buffer 100a is the highest priority request buffer that is seeking another line buffer. In step 454, the page mover determines if there is an outstanding request in request buffer 100b. If not, then the page mover determines if request buffer 100a has higher priority than request buffers 100c and 100d (if request buffers 100c and 100d are currently seeking a line buffer). If request buffer 100a has higher priority than request buffers 100c and 100d or at least higher priority than either of these request buffers that is seeking a line buffer or if neither request buffer 100c nor request buffer 100d is seeking a line buffer (decision 456), then the page mover loads the line request for request buffer 100a into line buffer 102b (step 458). If the answer to decision 456 is no, then the page mover returns to step 452 to determine if line buffer 102a is now available and then proceeds as noted above during the first iteration. Even if line buffer 102a is still not free in the next iteration of decision 452, line buffer 102b may now be free. Thus, if there is a higher priority request buffer than request buffer 100a, request buffer 100a will not be able to use any of the line buffers 102b–d but will maintain use of line buffer 102a. (There is no point in checking line buffers 102c or 102d because if request buffer 100a is not the highest priority for line buffer 102b, then request buffer 100a is not the highest priority for line buffers 102c or 102d, either.)

Referring again to decision 454, if during the first iteration there was an outstanding request in request buffer 100b, then page mover proceeds to step 464 to determine if there is an outstanding request in request buffer 100c. Steps 466 and 468 are similar to steps 456 and 458 described above. Referring again to decision 464, if during the first iteration there was an outstanding request in request buffers 100b and 100c, then page mover proceeds to steps 474–478 which are similar to steps 454–458 described above. After any of the line buffers is loaded with the line request from request buffer 100a, the page mover loops back to step 452 to attempt to find a line buffer for the next line request of request buffer 100a.

The following are examples of how the foregoing process divides up the four request buffers. If there is a single CPU or I/O request (in a single request buffer) and no other outstanding requests in the other three request buffers, then all four line buffers will be used for the one request during thirty two successive iterations of steps 119–134 or 172–199. During the first four iterations, the four line buffers will receive, in quick sequence, the first four requests and the page mover will quickly pass them to the execution stack. After each line request is passed to the stack, the line buffer is freed up to receive the next line. Because there is just one request buffer with an outstanding request, it will pass another line request to each line buffer when freed up. Because all four line buffers are used to satisfy the lone request, the request will be executed in the minimum amount of time.

If there are two concurrent requests of the same priority (in two request buffers), then four iterations of steps 119–134 or 172–199 will provide two line buffers for two lines of one request and two line buffers for two lines of the other request. After the line from each line buffer is passed to the execution stack, the line buffer is free to store the next line of the next request buffer. Over time, the line buffers will be evenly split between the two request buffers. If there are three pending requests of equal priority (in three request buffers), then over time each request will utilize one buffer for two thirds of the times and two buffers for one third of the times. If there are two requests of one priority and a third request of a lower priority, then each request will utilize the associated, respective line buffer and the two higher priority requests will also share use (at different times) of the remaining line buffer. If there are two requests of one priority and a third request of a higher priority, then each request will utilize the associated, respective line buffer and the higher priority request will also use the remaining line buffer. Thus, in general, each request buffer uses its associated line buffer, and the remaining line buffers, if any, are shared between the one or more highest priority requests.

Figures 7, 7A:
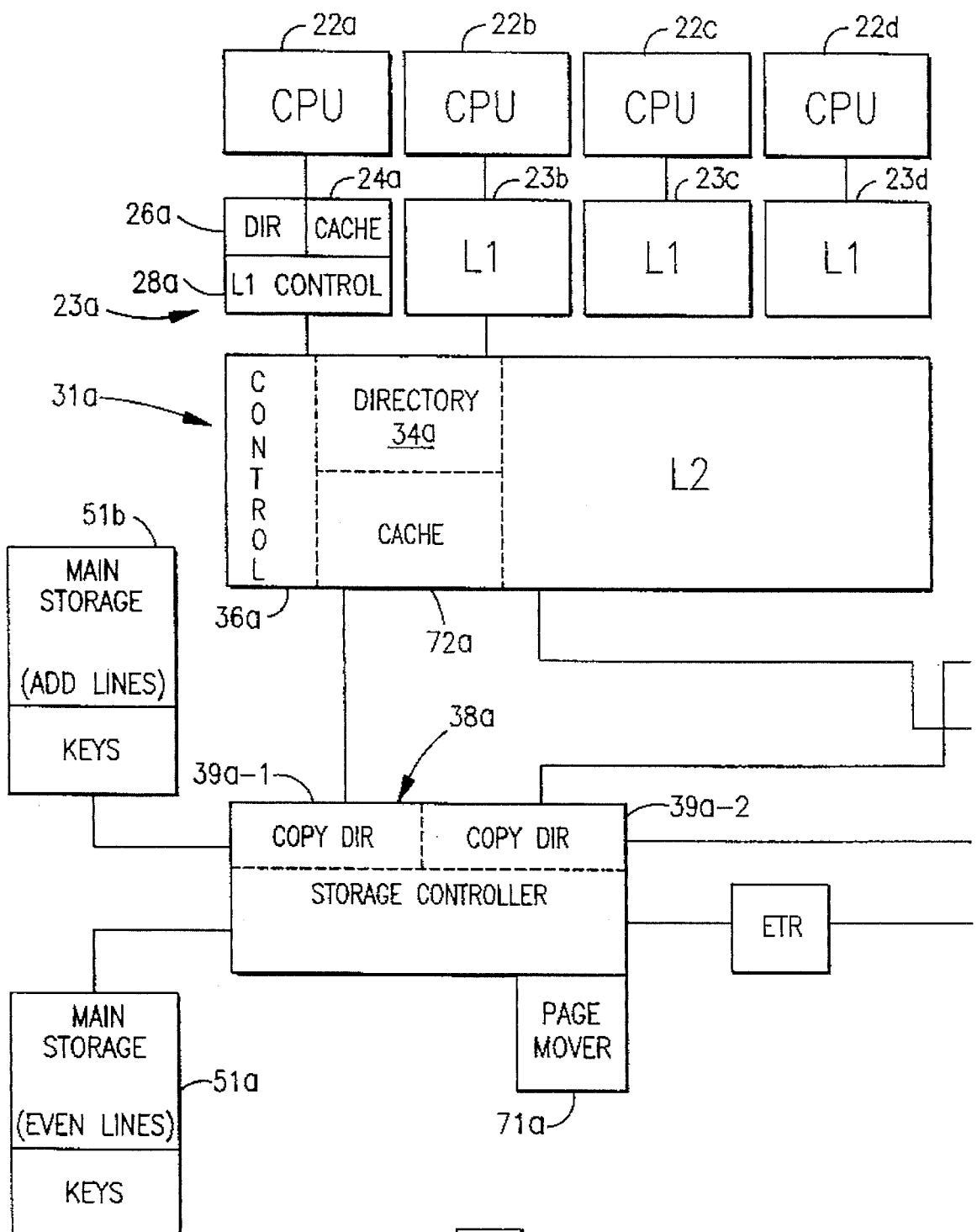
FIG. 7 is a high level block diagram of a clustered cache system (without a page mover) which was disclosed in U.S. patent application Ser. No. 08/123,495.
Figure 7B:
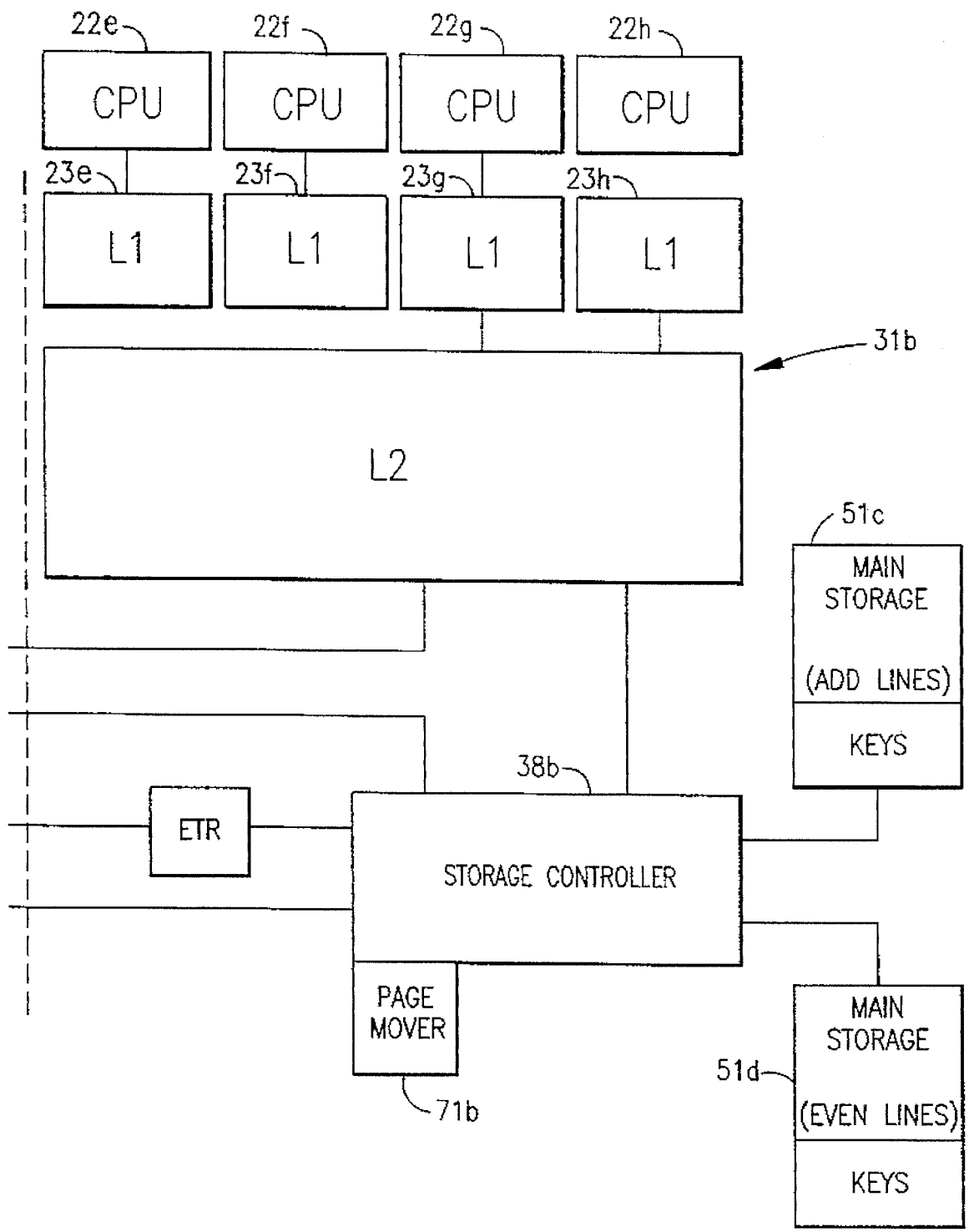
Figure 8B:
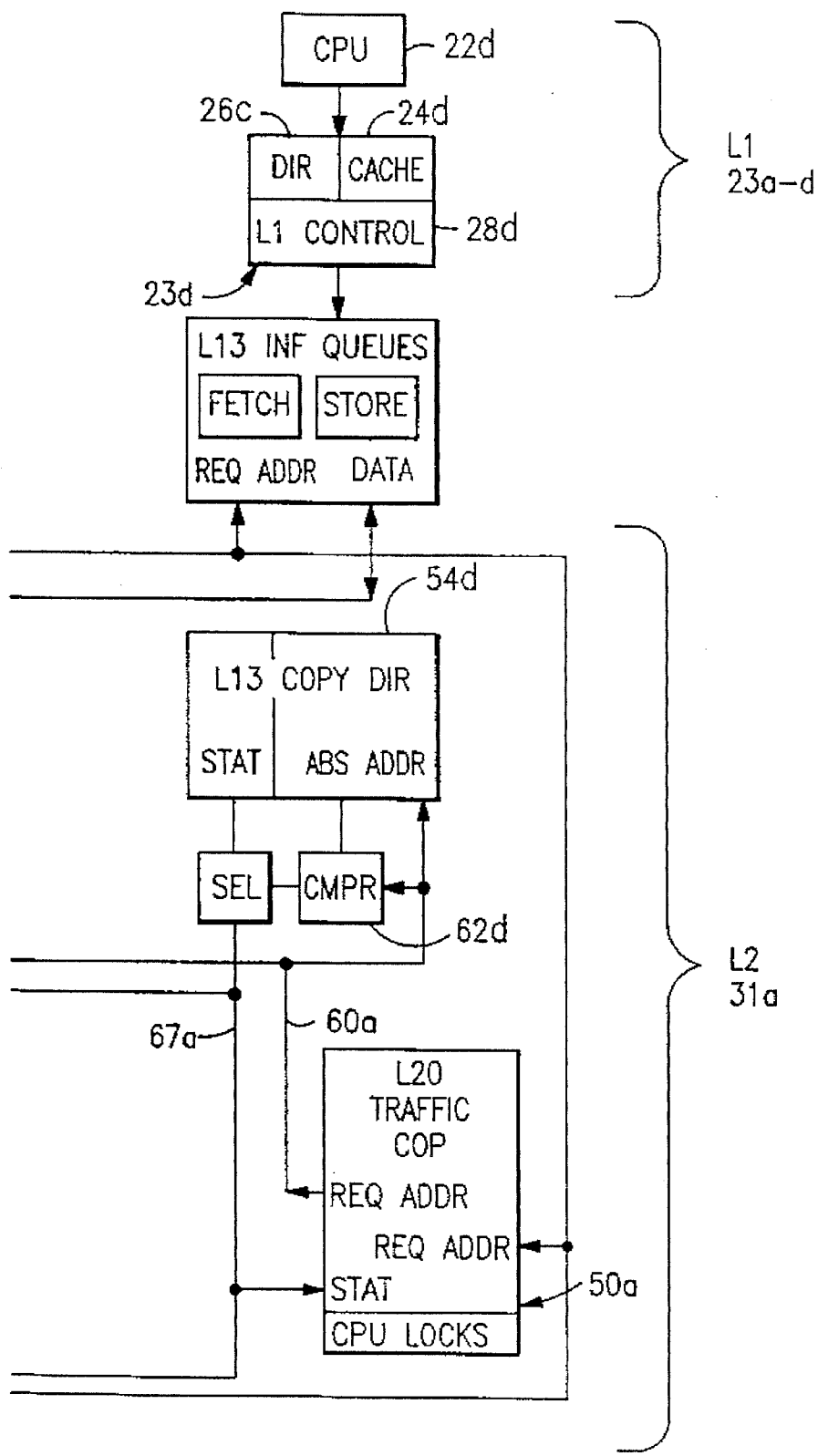
FIG. 8 is a more detailed diagram of one cluster of the clustered cache system of FIG. 7.
Figure 8A:
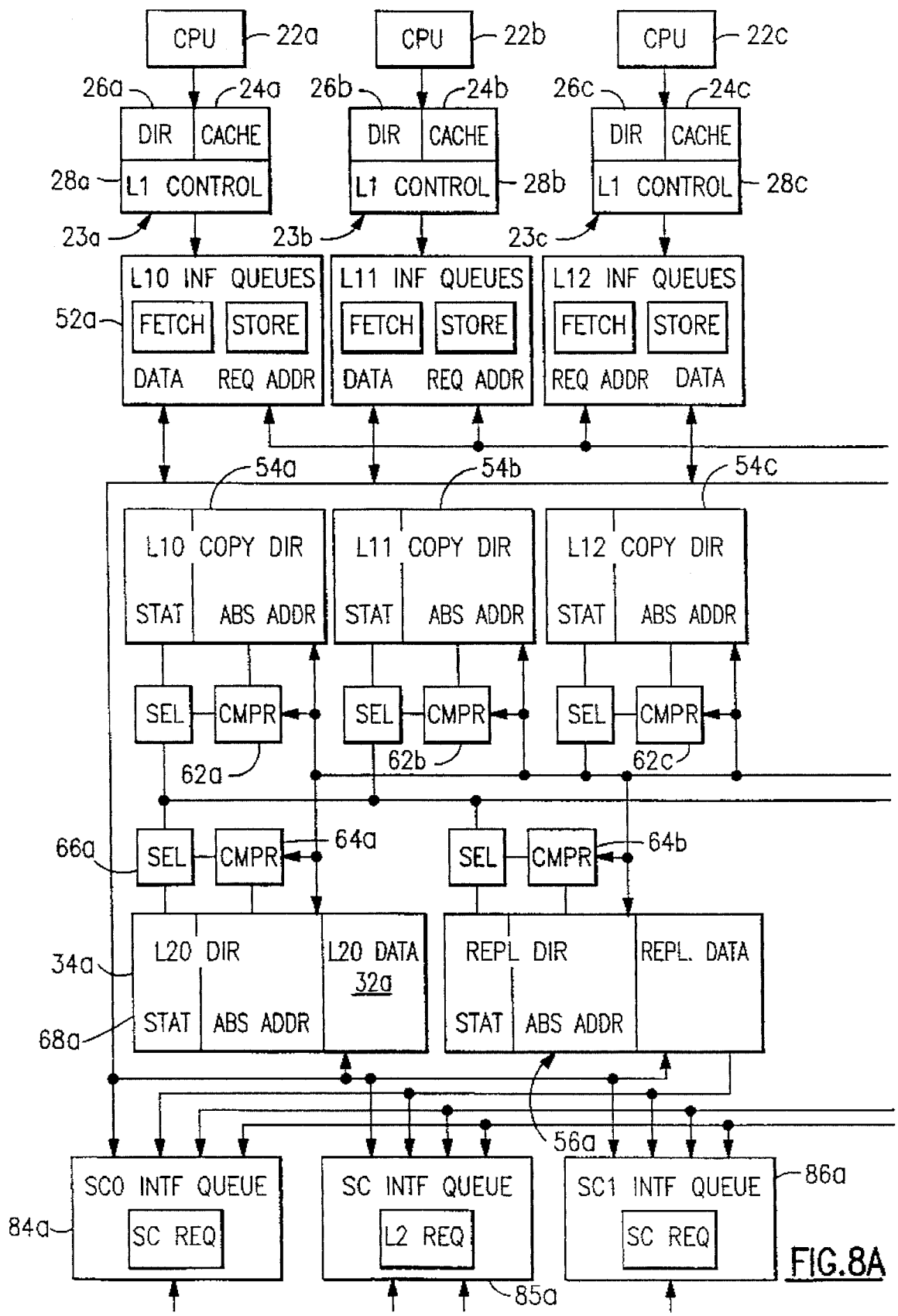
Figure 8C:
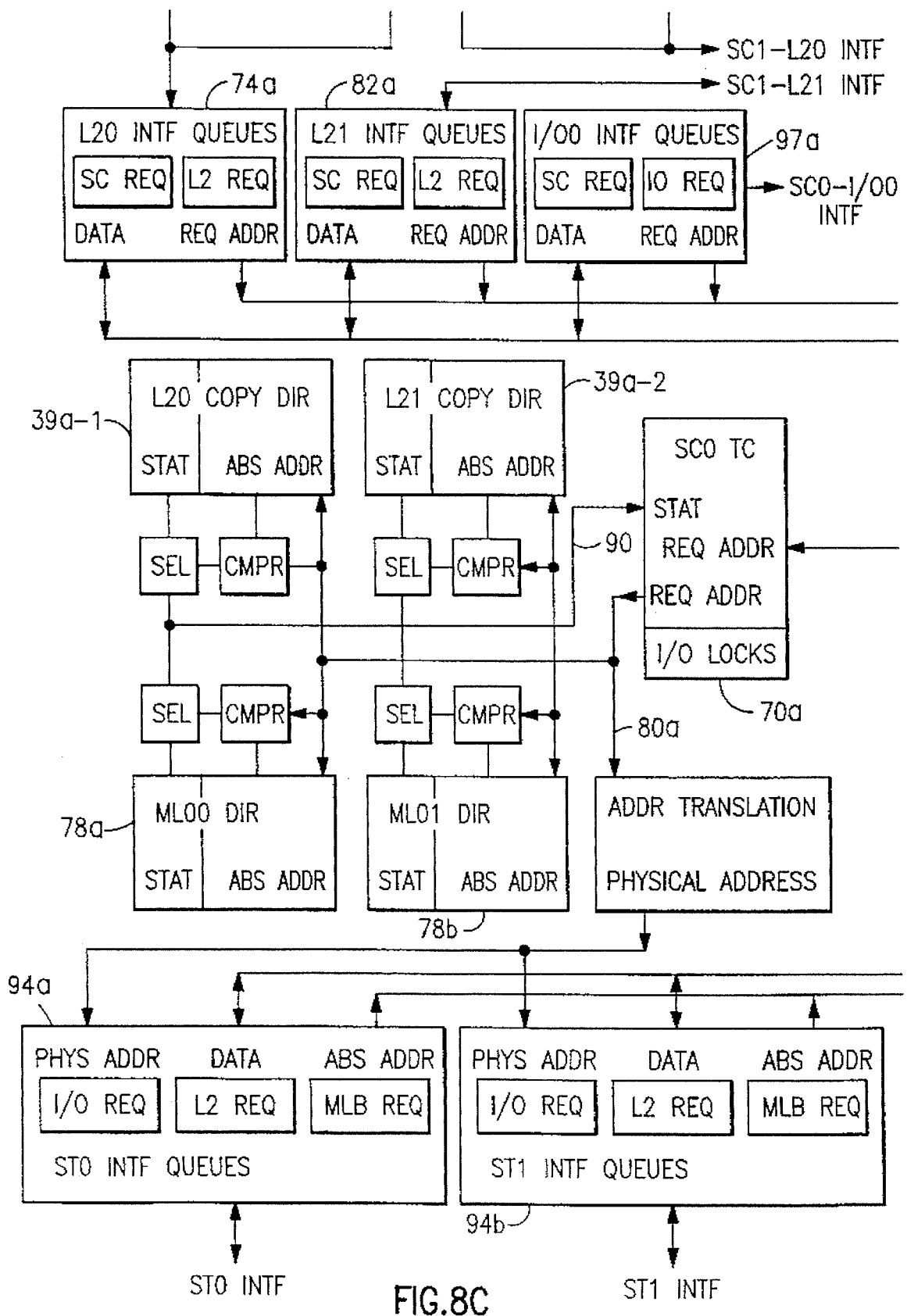
Figure 8D:
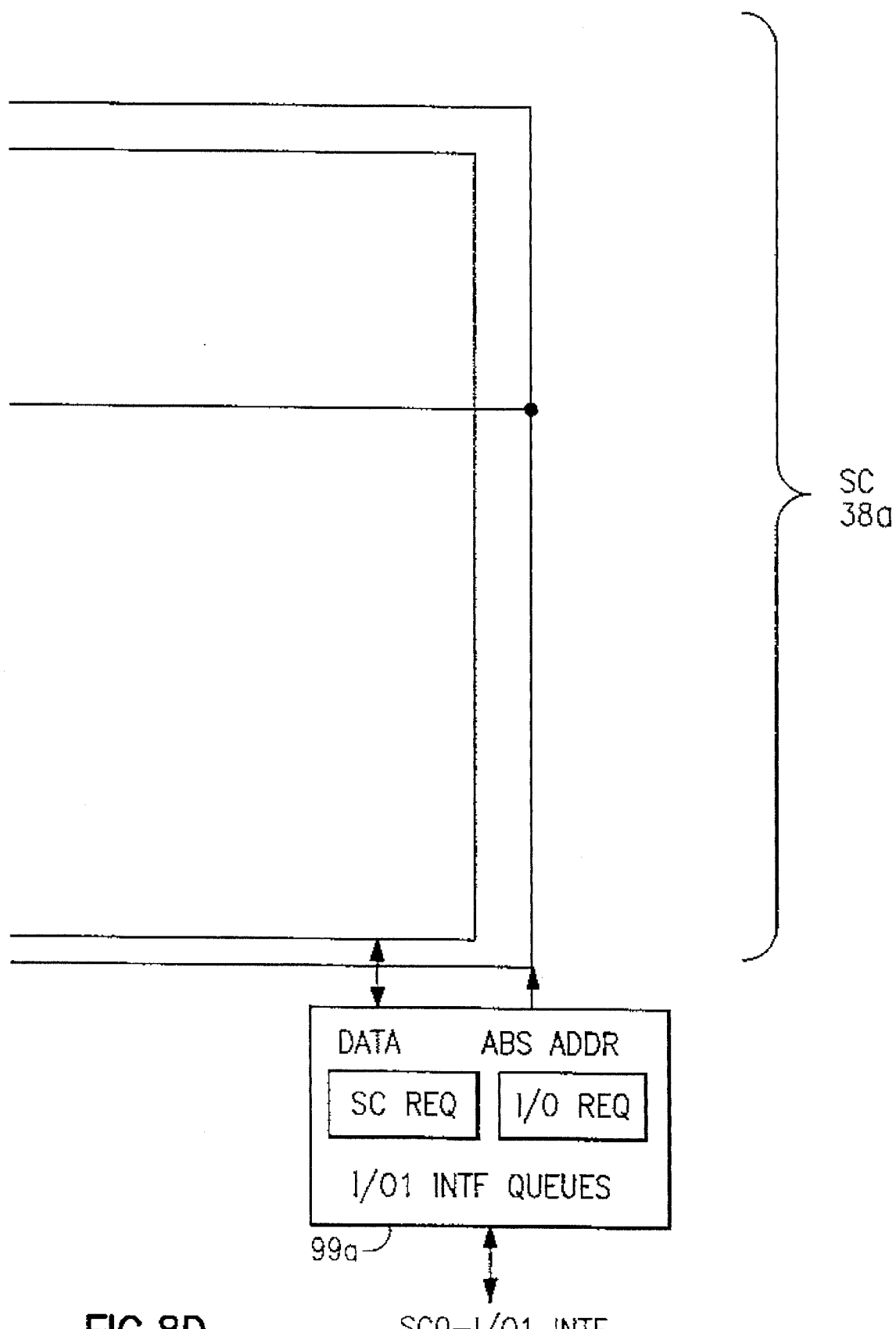

U.S. patent application Ser. No. 08/123,495, filed on Sep. 17, 1993 by J. W. Bishop et al. is hereby incorporated by reference as part of the present disclosure and discloses specific hardware illustrated in FIG. 7, except for page movers 71a and 71b. U.S. patent application Ser. No. 08/123,495 also discloses flow in which two (or more) L2 cache subsystems are provided and each of the L2 cache subsystems serves a cluster of four L1 cache subsystems. There is also a separate storage controller for each L2 cache subsystem. One purpose of the storage controller for each L2 cache is to search the other L2 cache when the respective L2 cache does not contain the requisite data. If the other L2 cache contains the requisite data, then the data is fetched from this other L2 cache. Another purpose of the storage controller for each L2 cache is to invalidate copies in the other L2 cache and associated L1 caches when data is updated in the respective L2 cache. Another mover 71b which is similar to page mover 71a is installed in storage controller 38b of the hierarchical cache system of U.S. patent application Ser. No. 08/123,495. In the case of a CPU PAGE COPY, CPU PAGE COPY & PURGE and I/O PAGE COPY operations, steps 180 and 195–198 are expanded for the clustered cache arrangement of FIG. 7 such that the storage controller also checks if any other L2 cache contains a copy of the data when the L2 cache of the requesting CPU I/O processor does not contain the data to be fetched. If the other L2 cache contains the data, and the L2 cache of the requesting COU or I/O processor does not, the page mover fetches the data from the other L2 cache in step 180. During the subsequent store operation of any of these copy requests, the page mover also sends (in step 195–196) invalidate signals to the other L2 cache for the To address. In the case of CPU PAGE STORE and I/O PAGE STORE ZERO operations, steps 130–133 are expanded for the clustered cache arrangement of FIG. 7 such that the storage controller also checks if any other L2 cache contains a copy of the data, and the page mover invalidates all copies in all L2 cache subsystems that contain the To address.

FIG. 8 is a more detailed block diagram of one cluster of the clustered cache system described in U.S. patent application Ser. No. 08/123,495 (without the movers 71a or 71b).

Based on the foregoing, page movers according to the present invention have been disclosed. However, numerous modifications and substitutions can be made without deviating from the scope of the present invention. Therefore, the invention has been disclosed by way of illustration and not limitation, and reference should be made to the following claims to determine the scope of the present invention.

We claim:

1. A hierarchical cache system comprising:

a plurality of first level cache subsystems for storing data of respective CPUs;

a higher level cache subsystem containing data of said plurality of cache subsystems;

a main memory coupled to said higher level cache subsystem; and data mover means, coupled to said higher level cache subsystem and said main memory, and responsive to a request from one of said CPUs to copy contents of one location in said main memory to another location in said main memory, said one location not being represented in said first or higher level cache subsystems, for fetching said contents from said one location in said main memory into a buffer separate from said first and higher level cache subsystems without copying said contents into said first or higher level cache subsystems in response to said request, writing said contents from said buffer to said other location in main memory, and invalidating or representation, if any, of said other location in said higher level cache subsystem.

2. A system as set forth in claim 1 wherein the invalidating means also initiates invalidation of representation(s) of said other location in said plurality of cache subsystems to the extent resident in said plurality of cache subsystems when said one CPU made said request.

3. A system as set forth in claim 1 wherein the invalidating means comprises a copy directory of data addresses in said higher level cache subsystem and means for comparing the address of said other location to said data addresses in said copy directory.

4. A system as set forth in claim 1 further comprising a multiplicity of CPU request buffers and associated data segment buffers separate from said first and higher level cache subsystems, said data segment buffers including the first said buffer; and when one or more of said request buffers do not contain outstanding requests, the data mover means divides the associated data segment buffers for use amongst the other request buffers which contain outstanding requests in addition to the data segment buffers previously associated with the request buffers that contain outstanding request.

5. A system as set forth in claim 4 wherein when one or more of said request buffers do not contain outstanding requests, the data segment buffers for which the corresponding request buffers do not contain outstanding requests are allocated to the request buffers that contain outstanding requests based on priority of the request buffers than contain the outstanding requests.

6. A system as set forth in claim 4 wherein one or more of said request buffers do not contain outstanding requests, the outstanding requests have the same priority, and the data segment buffers for which the corresponding request buffers do not contain outstanding requests are allocated to the request buffers generally evenly over time between said request buffers that contain outstanding requests of equal priority.

7. A system as set forth in claim 1 wherein said one CPU makes a subsequent request for said contents of said one location while said contents are resident in said buffer and said contents are not resident in said first level or higher level cache subsystems, and in response, said data mover means fetches said data from said one location in main memory into said higher level cache subsystem without regard for the presence of said contents in said buffer.

8. A system as set forth in claim 1 wherein said data mover means comprises processing hardware separate from said one CPU such that said one CPU can write data to said higher level cache subsystem while said data mover means moves the contents of said one location in main memory to said other location in main memory.

9. A system as set forth in claim 1 wherein said data mover means comprises processing hardware separate from said one CPU such that said one CPU can write data to one of said plurality of cache subsystems associated with said one CPU while said data mover means moves the contents of said one location in main memory to said other location in main memory.

10. A system as set forth in claim 1 further comprising a copy directory which contains a directory of the memory locations currently represented in said higher level cache subsystem and wherein the data mover means checks the copy directory pursuant to said request to determine if said one location is currently represented in said higher level cache subsystem.

11. A system as set forth in claim 1 wherein the data mover means is associated with said second level cache subsystem and, pursuant to said request, determines if said one location is currently represented in said higher level cache subsystem.

12. A hierarchical cache system comprising:

a plurality of first level cache subsystems for storing data of respective CPUs;

a higher level cache subsystem containing data of said plurality of cache subsystems;

a main memory coupled to said higher level cache subsystem; and data mover means, coupled to said higher level cache subsystem and said main memory, and responsive to a request from one of said CPUs to copy contents of one location in said main memory to another location in said main memory, a stale copy of said one location being stored in said higher level cache subsystem, for fetching current contents from said one location in said main memory into a buffer separate from said first and higher level cache subsystems without copying said current contents of said one location in main memory into said first or higher level cache subsystems in response to said request, invalidating said stale copy in said higher level cache subsystem, writing said current contents from said buffer to said other location in main memory, and invalidating a representation of said other location in said higher level cache subsystem if represented in said higher level cache subsystem when said CPU made said request.

13. A system as set forth in claim 12 wherein one of said first level cache subsystems also contains a stale copy of said one location when said request was made, and in response to said request, said data mover means invalidates said stale copy in said one first level cache subsystem.

14. A system as set forth in claim 13 wherein in response to said request, said data mover means invalidates representations in said first level cache subsystems of said other location to the extent resident in said first level cache subsystems when said CPU made said request.

15. A hierarchical cache system comprising:

a plurality of first level cache subsystems for storing data of respective CPUs;

a higher level cache subsystem containing data of said plurality of cache subsystems;

a main memory coupled to said higher level cache subsystem; and data mover means, coupled to said higher level cache subsystem and said main memory, and responsive to a request from one of said CPUs to fill a range of said memory with a smaller data pattern by writing said data pattern into a buffer separate from said first and higher level cache subsystems, repeatedly writing said data pattern from said buffer to fill said range in said main memory, and invalidating a representation, if any, of said range in said higher level cache subsystem.

16. A system as set forth in claim 15 wherein the data mover means comprises processing hardware separate from the one CPU such that said one CPU can write other data to said higher level cache subsystem while said data mover means writes said data pattern from said buffer to said range in main memory.

17. A system as set forth in claim 15 wherein the data mover means comprises processing hardware separate from the one CPU such that said one CPU can write other data to one of said first level cache subsystems associated with said one CPU while said data mover means writes said data pattern from said buffer to said range in main memory.

18. A system as set forth in claim 15 further comprising means for executing a CPU command to write data to said higher level cache subsystem while said data mover means writes said data pattern from said buffer to said range in main memory.

* * * * *